United States Patent
Hino

(10) Patent No.: US 10,693,357 B2
(45) Date of Patent: Jun. 23, 2020

(54) STRADDLED VEHICLE STARTER MOTOR, ENGINE START-UP DEVICE, AND STRADDLED VEHICLE

(71) Applicant: YAMAHA HATSUDOKI KABUSHIKI KAISHA, Iwata-shi, Shizuoka (JP)

(72) Inventor: Haruyoshi Hino, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 169 days.

(21) Appl. No.: 15/887,979

(22) Filed: Feb. 2, 2018

(65) Prior Publication Data

US 2018/0159410 A1    Jun. 7, 2018

Related U.S. Application Data

(63) Continuation-in-part of application No. PCT/JP2016/070543, filed on Jul. 12, 2016.

(30) Foreign Application Priority Data

Aug. 3, 2015 (JP) ................................. 2015-153134

(51) Int. Cl.
*H02K 23/16* (2006.01)
*H02K 23/04* (2006.01)
(Continued)

(52) U.S. Cl.
CPC ............. *H02K 23/16* (2013.01); *F02N 11/00* (2013.01); *F02N 11/0862* (2013.01); *H02K 1/17* (2013.01);
(Continued)

(58) Field of Classification Search
CPC .......... H02K 23/16; H02K 1/17; H02K 1/187; H02K 7/116; H02K 13/006; H02K 23/04; H02K 7/10; F02N 11/00; F02N 11/0862
(Continued)

(56) References Cited

U.S. PATENT DOCUMENTS

| 4,338,536 A | * 7/1982 | Hallidy .................... H02K 3/44 310/191 |
| 4,481,437 A | 11/1984 | Parker |
| 6,054,777 A | 4/2000 | Soh |

FOREIGN PATENT DOCUMENTS

| CN | 201635900 U | 11/2010 |
| CN | 201639379 U | 11/2010 |

(Continued)

*Primary Examiner* — Thomas Truong
(74) *Attorney, Agent, or Firm* — Rabin & Berdo, P.C.

(57) ABSTRACT

A starter motor for starting up an engine mounted to a straddled vehicle. The starter motor includes a rotor, a brush in contact with the rotor to cause a current supplied thereto, and a movable permanent magnet arranged to oppose a core of the rotor with a gap therebetween and to be movable in a circumferential direction of the rotor within an angle range. The angle range includes a retarded angle position and an advanced angle position in which the movable permanent magnet is displaced respectively in a retarded and advanced angle direction relative to the brush. The movable permanent magnet is located in the advanced angle position when the rotor starts to rotate upon a supply of the current to the rotor, and to be moved in the retarded angle direction to the retarded angle position within a period in which the rotor is rotating with the current supplied to the rotor.

38 Claims, 9 Drawing Sheets

(51) Int. Cl.
  *F02N 11/00* (2006.01)
  *F02N 11/08* (2006.01)
  *H02K 1/17* (2006.01)
  *H02K 1/18* (2006.01)
  *H02K 7/116* (2006.01)
  *H02K 13/00* (2006.01)
  *H02K 7/10* (2006.01)

(52) U.S. Cl.
  CPC ............ *H02K 1/187* (2013.01); *H02K 7/116* (2013.01); *H02K 13/006* (2013.01); *H02K 23/04* (2013.01); *H02K 7/10* (2013.01)

(58) Field of Classification Search
  USPC .................. 310/191, 154.34, 154.01–154.49
  See application file for complete search history.

(56) References Cited

FOREIGN PATENT DOCUMENTS

| | | |
|---|---|---|
| CN | 102710039 B | 6/2014 |
| CN | 203756411 U | 8/2014 |
| CN | 203761155 U | 8/2014 |
| CN | 203761211 U | 8/2014 |
| DE | 800422 C | 11/1950 |
| EP | 2824826 A2 | 1/2015 |
| JP | S55-26097 A | 2/1980 |
| JP | S61-173654 A | 8/1986 |
| JP | 2000-270529 A | 9/2000 |
| JP | 2010-154704 A | 7/2010 |
| WO | WO-2012/105308 A1 | 8/2012 |

\* cited by examiner

STRADDLED VEHICLE STARTER MOTOR, ENGINE START-UP DEVICE, AND STRADDLED VEHICLE

CROSS-REFERENCE TO RELATED APPLICATIONS

This application is a continuation-in-part application of International Application PCT/JP2016/070543 filed on Jul. 12, 2016, which claims priority to Japanese Patent Application No. 2015-153134, filed on Aug. 3, 2015, the entire contents of which are incorporated herein by reference.

BACKGROUND OF THE INVENTION

Technical Field

The present teaching relates to a straddled vehicle starter motor, an engine start-up device, and a straddled vehicle.

Description of Related Art

A straddled vehicle as exemplified by a motorcycle includes a starter motor for starting up an engine. At a time of starting up the engine, a straddled vehicle starter motor receives a power supply from a battery provided in the straddled vehicle, to rotate a crankshaft so that the engine is started up.

As the straddled vehicle starter motor, a brush motor that supplies a current to a rotor by using a brush is often adopted. The brush motor, in which a current flowing in windings is switched by a function of a brush and a commutator, is operable with a DC current supplied from a battery provided in a straddled vehicle.

Japanese Patent Application Laid-Open No. 2010-154704 ("JPA'704") shows a brush motor. The brush motor of JPA'704 is a starter motor adoptable as a driving source of an engine start-up device of a motorcycle, etc. The starter motor as shown in JPA'704 is required to, at a time of starting up an engine, output a high torque in order to rotate a crankshaft of the engine that has been stopped. It is also required to, after starting a combustion operation of the engine, rotate the crankshaft at a high rotation speed in order to stabilize the engine operation.

Generally in a starter motor that drives an engine of a straddled vehicle, a high output torque under a low rotation speed, e.g., under a state where rotation is starting, and a high rotation speed under a low output torque are demanded.

Reducing the number of turns of a winding of a straddled vehicle starter motor is one conceivable way to enable the straddled vehicle starter motor to rotate at a high rotation speed under a limited voltage condition associated with, for example, a battery voltage of the straddled vehicle. Reducing the number of turns of a winding can lead to suppression of an induced voltage which hinders a current supply, thus enabling a current to be supplied even at a high rotation speed. As a result, the straddled vehicle starter motor can be rotated at a high rotation speed. Reducing the number of turns of a winding, however, leads to a decrease in the torque that can be output under a low rotation speed, e.g., under a state where rotation is starting.

SUMMARY OF INVENTION

For example, increasing the diameter or thickness of a winding with increasing a magnetic force of a permanent magnet is conceivable as a way to maintain an output torque at a time of starting rotation though the number of turns of the winding is reduced. For example, increasing the diameter or thickness of a winding enables a large current to flow in the winding under a low rotation speed. To supply a large current to the winding, however, a large-size battery has to be provided in a straddled vehicle. Increasing the thickness of a winding and increasing a magnetic force of a permanent magnet mean a size increase of a straddled vehicle starter motor itself. This leads to a deterioration in mountability to a straddled vehicle. Under a condition that the size of the straddled vehicle starter motor be maintained, a high output torque under a low rotation speed and a high rotation speed under a low output torque are in the trade-off relationship. It therefore has been difficult to improve both output torque characteristics and rotation speed characteristics with a simple configuration while improving mountability of the straddled vehicle starter motor to a vehicle.

The present teaching provides a straddled vehicle starter motor, an engine start-up device, and a straddled vehicle that are able to improve output torque characteristics and rotation speed characteristics for starting up an engine with a simple configuration, while improving mountability to a vehicle.

The present teaching adopts the following configurations.

(1) A straddled vehicle starter motor that starts up an engine mounted to a straddled vehicle, the straddled vehicle starter motor including:

a rotor configured to be rotatable, and including a winding, a core with the winding wound thereon, and a commutator electrically connected to the winding;

a brush configured to contact the commutator to cause a current to flow in the rotor, the brush having the position thereof fixed with respect to a rotation direction of the rotor; and a movable permanent magnet arranged so as to oppose the core with a gap therebetween and so as to be movable in a circumferential direction of the rotor independently of the rotor within an angle range including a retarded angle position and an advanced angle position, the retarded angle position being an angle position where the movable permanent magnet is displaced in a retarded angle direction relative to the brush, the advanced angle position being an angle position where the movable permanent magnet is displaced in an advanced angle direction relative to the brush as compared to the retarded angle position and where a higher torque is caused in the rotor than a torque caused in the retarded angle position, the movable permanent magnet being configured to be located in the advanced angle position at a time point when the rotor starts rotation upon a current supply to the rotor, and to be moved in the retarded angle direction to the retarded angle position within a period in which the rotor is rotating with a current supplied to the rotor.

The straddled vehicle starter motor of (1) includes the rotor, the brush, and the movable permanent magnet. When the straddled vehicle starter motor starts up the engine, rotation of the rotor is transmitted to the engine. In the straddled vehicle starter motor of (1), the rotor includes the winding, the core with the winding wound thereon, and the commutator electrically connected to the winding. The movable permanent magnet is arranged so as to be movable in the circumferential direction of the rotor independently of the rotor. The movable permanent magnet is movable within the angle range including the retarded angle position and the advanced angle position. The retarded angle position is a position where the angle position relative to the brush is displaced in the retarded angle direction, and the advanced angle position is a position where the angle position relative to the brush is displaced in the advanced angle direction as compared to the retarded angle position.

Here, the advanced angle direction is a direction opposite to the rotation direction of the rotor that is rotating with a current supplied from the brush. The retarded angle direction is the same direction as the rotation direction of the rotor.

The movable permanent magnet is located in the advanced angle position at a time point when the rotor starts rotation upon a current supply to the rotor. From the viewpoint of a commutation timing of the winding, a state where the movable permanent magnet is in the advanced angle position is equivalent to, for example, a state where a brush is in the retarded angle position in a case where the brush is rotatable. Accordingly, when the movable permanent magnet is located in the advanced angle position, a higher torque is caused in the rotor than a torque caused when the movable permanent magnet is located in the retarded angle position. Thus, an output torque at the time point when the rotor starts rotation increases. In other words, an output torque at a time point when engine start-up is started increases.

The movable permanent magnet is moved in the retarded angle direction within the period in which the rotor is rotating with a current supplied to the rotor. From the viewpoint of a commutation timing of the winding, a state where the movable permanent magnet is in the retarded angle position is equivalent to, for example, a state where a brush is in the advanced angle position in a case where the brush is rotatable. Accordingly, when the movable permanent magnet is located in the retarded angle position, an induced voltage is less influential. Thus, the rotation speed of the rotor increases.

The straddled vehicle starter motor of (1), in which engine start-up is started by movement of the movable permanent magnet without movement of the brush, can achieve both an operation state that provides an improved output torque under a low rotation speed and an operation state that increases the rotation speed when the torque is low after a combustion operation of the engine is started. Accordingly, the straddled vehicle starter motor of (1) can improve output torque characteristics and rotation speed characteristics for starting up the engine with a simple configuration, while improving mountability to a vehicle.

(2) The straddled vehicle starter motor of (1), in which the movable permanent magnet opposing the core with the gap therebetween is configured to be moved in the advanced angle direction relative to the brush by a reaction force of the rotor that acts on the movable permanent magnet at least within a period in which a current is supplied to the rotor.

In the straddled vehicle starter motor of (2), when the movable permanent magnet opposing the core with the gap therebetween is moved in the advanced angle direction, a higher torque is caused in the rotor as compared to when the movable permanent magnet is in the retarded angle position. Thus, an output torque under a low rotation speed increases. In the straddled vehicle starter motor of (2), a reaction force of the rotor is used to move the movable permanent magnet for increasing the output torque under a low rotation speed. The reaction force is caused by a magnetic effect of the movable permanent magnet and the rotor within the period in which a current is supplied to the rotor. Accordingly, the straddled vehicle starter motor of (2) can increase the output torque under a low rotation speed with a simpler configuration, while improving mountability to a vehicle.

(3) The straddled vehicle starter motor of (1) or (2), further including an advanced angle movement limiting unit configured to limit movement of the movable permanent magnet farther than the angle range in the advanced angle direction.

The straddled vehicle starter motor of (3) limits movement of the movable permanent magnet farther than the angle range in the advanced angle direction. This can suppress a situation where the output torque under a low rotation speed decreases due to excessive movement of the movable permanent magnet in the advanced angle direction. The straddled vehicle starter motor of (3) can further improve output torque characteristics.

Examples of the advanced angle limiting unit include a protrusion, a step, and the like, configured to abut the movable permanent magnet or a member that moves integrally with the movable permanent magnet. Examples of the advanced angle limiting unit also include a member for coupling the movable permanent magnet or a member that moves integrally with the movable permanent magnet to a housing, etc.

(4) The straddled vehicle starter motor of any one of (1) to (3), further including a retarded angle movement limiting unit that limits movement of the movable permanent magnet farther than the angle range in the retarded angle direction.

The straddled vehicle starter motor of (4) limits movement of the movable permanent magnet farther than the angle range in the retarded angle direction. This can suppress a situation where an increase in the rotation speed is hindered in the operation state that increases the rotation speed. The brush motor of (4) can further improve output torque characteristics.

Examples of the retarded angle limiting unit include a protrusion, a step, and the like, configured to abut the movable permanent magnet or a member that moves integrally with the movable permanent magnet. Examples of the retarded angle limiting unit also include a member for coupling the movable permanent magnet or a member that moves integrally with the movable permanent magnet to a housing, etc.

(5) The straddled vehicle starter motor of any one of (1) to (4), further including a magnet moving unit configured to locate the movable permanent magnet opposing the core with the gap therebetween in the advanced angle position at a time point when the rotor starts rotation upon a current supply to the rotor, and to move the movable permanent magnet in the retarded angle direction to the retarded angle position within a period in which the rotor is rotating with a current supplied to the rotor.

In the straddled vehicle starter motor of (5), the magnet moving unit locates the movable permanent magnet in the advanced angle position at the time point when the rotor starts rotation. Accordingly, both an operation state that provides an improved output torque under a low rotation speed at which engine start-up is started and an operation state that increases the rotation speed can be achieved easily.

Examples of the magnet moving unit include an elastic member configured to move the movable permanent magnet with an elastic force, an actuator configured to move the movable permanent magnet with electric power, or a motor.

(6) The straddled vehicle starter motor of (5), in which the magnet moving unit moves the movable permanent magnet in the retarded angle direction to the retarded angle position based on an increase in the rotation speed of the rotor within a period in which the rotor is rotating with a current supplied to the rotor.

The straddled vehicle starter motor of (6), in which the movable permanent magnet is moved in the retarded angle direction to the retarded angle position based on an increase in the rotation speed of the rotor within the period in which the rotor is rotating with a current supplied to the rotor, can smoothly widen the rotation speed range of the rotor.

(7) The straddled vehicle starter motor of (5) or (6), in which the magnet moving unit includes an elastic member that biases the movable permanent magnet in the retarded angle direction with an elastic force.

The straddled vehicle starter motor of (7), which uses the elastic force of the elastic member as a force for biasing the movable permanent magnet in the retarded angle direction, can improve output torque characteristics and rotation speed characteristics with a simpler configuration.

Examples of the elastic member include a spring and an elastomer. Examples of the elastic member also include a torsion spring, a coil spring, a leaf spring, and an air spring.

(8) The straddled vehicle starter motor of (7), in which the elastic member is configured such that an elastic force of the elastic member is weaker than a reaction force of the rotor that acts on the movable permanent magnet at a time when the rotor starts rotation and stronger than a reaction force of the rotor that acts on the movable permanent magnet when a torque decreases along with an increase in the rotation speed of the rotor.

In the straddled vehicle starter motor of (8), the elastic force of the elastic member is weaker than the reaction force of the rotor that acts on the movable permanent magnet at a time when the rotor starts rotation, so that the movable permanent magnet is moved in the advanced angle direction by the reaction force of the rotor at the time when the rotor starts rotation. Thus, the output torque can be improved at the time when the rotor starts rotation. In addition, the elastic force of the elastic member is stronger than the reaction force of the rotor that acts on the movable permanent magnet when a torque decreases along with an increase in the rotation speed of the rotor, so that the movable permanent magnet is moved in the retarded angle direction by the elastic force along with an increase in the rotation speed of the rotor. Thus, the rotation speed can be improved. This way, the straddled vehicle starter motor of (8), in which movement of the movable permanent magnet in the advanced angle direction and in the retarded angle direction is implemented as a self-adjustment function using the elastic force of the elastic member and the reaction force of the rotor, can improve output torque characteristics and rotation speed characteristics with a simpler configuration, while improving mountability to a vehicle.

(9) The straddled vehicle starter motor of (7) or (8), in which before a current supply to the rotor is started, the movable permanent magnet is located in the retarded angle position by a biasing force that the elastic member exerts in the retarded angle direction, and the elastic member is configured to: allow the movable permanent magnet to move to the advanced angle position such that movement of the movable permanent magnet in the advanced angle direction by a reaction force of the rotor that acts on the movable permanent magnet is started within a period from when a current supply to the rotor is started to when the rotor rotates; and move the movable permanent magnet located in the advanced angle position in the retarded angle direction by a biasing force of the elastic member when a torque decreases along with an increase in the rotation speed of the rotor.

In the straddled vehicle starter motor of (9), the movable permanent magnet is moved to the advanced angle position by the reaction force of the rotor at a time when the rotor starts rotation. Moreover, the movable permanent magnet is moved to the retarded angle position by the elastic force along with an increase in the rotation speed of the rotor. Accordingly, output torque characteristics and rotation speed characteristics can be improved with a simpler configuration, while mountability to a vehicle can be improved.

(10) The straddled vehicle starter motor of any one of (1) to (9), further including a housing that houses at least the rotor, the brush, and the movable permanent magnet, in which the rotor is rotatably supported on the housing, the brush is provided to the housing such that the position of the brush with respect to a rotation direction of the rotor is fixed, and the movable permanent magnet is supported on the housing so as to be movable in a circumferential direction of the rotor independently of the rotor.

In the configuration of (10), the housing houses at least the rotor, the brush, the movable permanent magnet, and the magnet moving unit. In addition, the housing rotatably supports the rotor, fixes the position of the brush with respect to the rotation direction of the rotor, and supports the movable permanent magnet such that the movable permanent magnet is movable in the circumferential direction of the rotor independently of the rotor. Accordingly, a compact straddled vehicle starter motor can be achieved, and a size increase of the straddled vehicle starter motor can be suppressed.

(11) The straddled vehicle starter motor of (10), including:

a plurality of the movable permanent magnets arranged side by side in a circumferential direction of the rotor; and a movable yoke part having the plurality of movable permanent magnets fixed thereto and arranged between the movable permanent magnets and the housing, in which the plurality of movable permanent magnets are supported on the housing via the movable yoke part.

In the configuration of (11), the movable yoke part having the movable permanent magnets fixed thereto is arranged between the housing and the movable permanent magnets, and thus a local deviation of a magnetic flux is suppressed in a region on the other side of the movable yoke part as viewed from the movable permanent magnets. Accordingly, when the movable permanent magnets are moved, smooth movement of the movable permanent magnets is obtained because a variation in a resistance force due to a deviation of a magnetic force that the permanent magnets exert on the housing is suppressed. This can achieve smooth change of output torque characteristics and rotation speed characteristics.

(12) An engine start-up device that starts up an engine mounted to a straddled vehicle, the engine start-up device including:

the straddled vehicle starter motor of any one of (1) to (11); and a reduction drive connected to the rotor, and configured to transmit rotation of the rotor to the engine while decelerating the rotation.

The engine start-up device of (12) can improve output torque characteristics and rotation speed characteristics for starting up the engine with a simple configuration, while improving mountability to the straddled vehicle.

To increase the output torque of the engine start-up device, rotation of the rotor of the straddled vehicle starter motor is decelerated by the reduction drive. The engine start-up device of (12), in which the output torque under a low rotation speed at a time of engine start-up is improved, can reduce the speed reduction ratio of the reduction drive. Accordingly, a driving noise of the engine start-up device mounted to the straddled vehicle can be suppressed.

(13) A straddled vehicle including:
the engine start-up device of (12); and
an engine that is started up by the engine start-up device.

The straddled vehicle of (13) can improve start-up properties of the engine, while improving mountability of the engine start-up device to a vehicle.

The straddled vehicle starter motor of the present teaching is a DC motor. The straddled vehicle starter motor is a motor in which a current flowing in a winding is switched by a brush and a commutator. Examples of the straddled vehicle starter motor include a radial gap type motor or an axial gap type motor. The number of brushes is not particularly limited. For example, the number of brushes may be two, three, or more. Examples of the brush include a brush fixed to a housing, etc. of the straddled vehicle starter motor and a brush movably supported on a housing, etc. of the straddled vehicle starter motor. The number of movable permanent magnets is not particularly limited. Examples of the movable permanent magnet include a magnet directly and movably supported on a housing, etc. of the straddled vehicle starter motor and a magnet fixed to a movable part that is movably supported on a housing, etc. of the straddled vehicle starter motor. A range within which the advanced angle position and the retarded angle position of the present teaching are set may be a position range of the movable permanent magnet where a torque can be caused in the rotor upon a current supply to the rotor. The retarded angle position and the advanced angle position may be set within a range including a maximum torque position which is a position of the movable permanent magnet where the maximum torque is caused in the rotor upon a current supply to the rotor, for example. The retarded angle position and the advanced angle position may be set within a range ranging from a maximum torque position to a position displaced therefrom in the retarded angle direction by 90° in electrical angle, the maximum torque position being a position of the movable permanent magnet where the maximum torque is caused in the rotor upon a current supply to the rotor. In this configuration, a torque having the same orientation can be caused in the rotor upon a current supply to the rotor.

(14) The straddled vehicle starter motor of (10) or (11), wherein the housing includes a limiting unit that prevents the movable permanent magnet from moving beyond the angle range.

The present teaching can improve output torque characteristics and rotation speed characteristics for starting up an engine with a simple configuration, while improving mountability to a vehicle.

DESCRIPTION OF EMBODIMENTS

Figure 1:
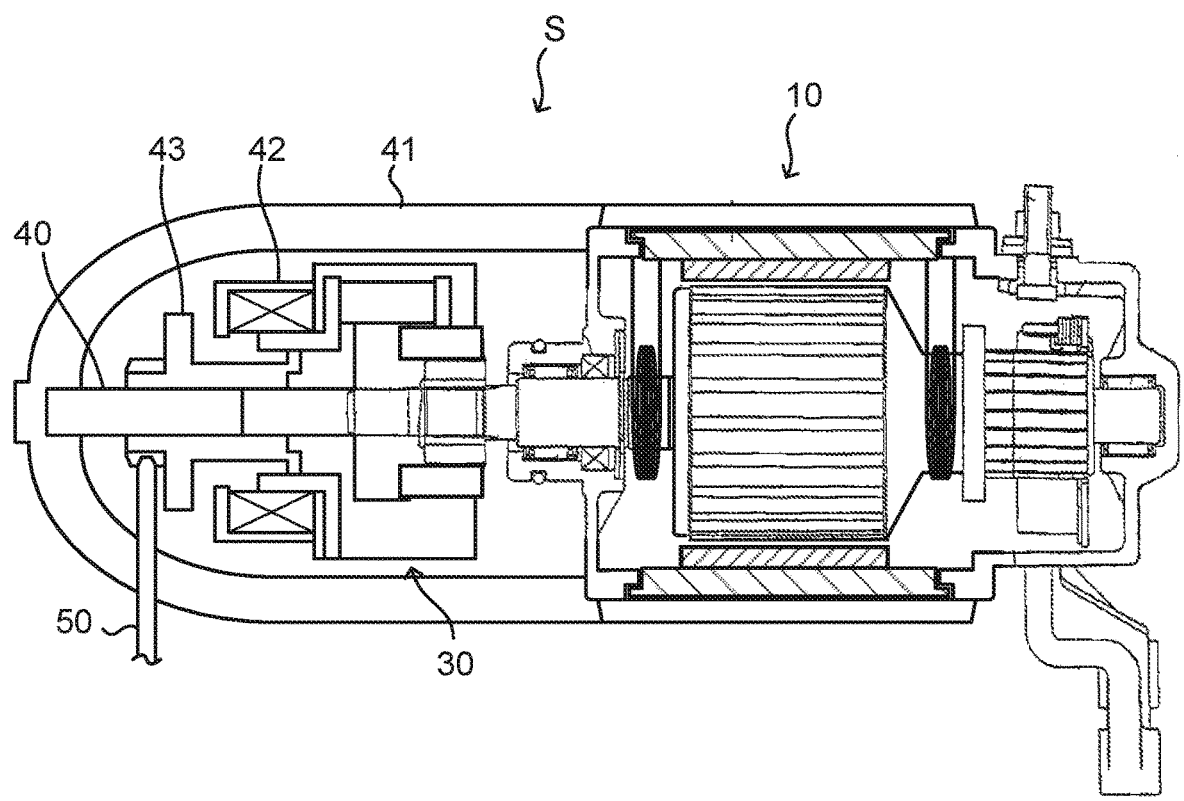
FIG. 1 is a cross-sectional view showing an outline configuration of an engine start-up device including a straddled vehicle starter motor according to a first embodiment of the present teaching.

A description will be given of studies that the inventor of the present teaching conducted about output torque characteristics and rotation speed characteristics of a straddled vehicle starter motor constituted of a brush motor.

The inventor of the present teaching tried arranging a brush of a straddled vehicle starter motor constituted of a brush motor at a position that is rotationally displaced in an advanced angle direction which means a direction opposite to a rotation direction of a rotor, for the purpose of obtaining a high rotation speed. Displacing the brush position in the advanced angle direction, however, resulted in an output torque being lowered when the rotation speed is low. Like this, it has been difficult to improve both output torque characteristics and rotation speed characteristics by displacing the brush in the advanced angle direction.

The inventor of the present teaching then employed a trial configuration in which the brush position is dynamically displaced during operation of a straddled vehicle starter motor, as means for obtaining both a high output torque under a low rotation speed and a high rotation speed under a low output torque. Here, the brush is a member that supplies a current to a rotor while being in contact with the rotating rotor. Therefore, a conductor such as a wire is connected to the brush. Normally, the conductor connected to the brush is partially held in a housing of the brush motor. The brush, which is connected to such a conductor, is not suitable for rotating a rotor while being appropriately kept contact with the rotor during operation. Making the brush movable leads to a complicated structure of the brush motor.

In view of such a design concept, the inventor of the present teaching conducted intensive studies for improving output torque characteristics and rotation speed characteristics with a simple configuration while improving mountability of the straddled vehicle starter motor to a vehicle.

An advanced angle of the brush for obtaining a high rotation speed is determined by its position relative to the permanent magnet. That is, fixing the brush and rotating the permanent magnet in a direction opposite to the advanced angle direction can provide characteristics equivalent to those obtained by rotating the brush in the advanced angle direction. Here, a reaction of an output torque occurs in the permanent magnet. This is why rotating the permanent magnet in the direction opposite to the advanced angle direction has conventionally not been taken into account.

In this respect, when, for example, the rotation speed of the rotor is high and therefore rotating the brush in the advanced angle direction is necessary, a reaction occurring in the permanent magnet is small due to a low output torque. Moreover, unlike the brush, the permanent magnet has no conductor connected thereto. It therefore is possible that the permanent magnet is rotated independently of the position where the brush contacts the rotor. The inventor of the present teaching consequently reached the findings that configuring the permanent magnet so as to be rotatable and rotating it in a retarded angle direction which is opposite to the advanced angle direction enables adjustment equivalent to rotating the brush in the advanced angle direction.

The present teaching is a teaching accomplished based on the findings that, in view of the design concept of changing the set position of the brush, dynamically changing the position of the movable permanent magnet enables improvement in output torque characteristics and rotation speed characteristics.

When a current is supplied to the rotor so that the rotor is rotated, the permanent magnet receives a reaction force in the direction opposite to the direction of the torque occurring in the rotor. In other words, the reaction force acts reversely to the rotation direction of the rotor. The magnitude of the reaction force, similarly to the output torque, tends to increase as the rotation speed of the rotor is lower and decrease as the rotation speed of the rotor is higher.

The inventor of the present teaching further found out that configuring the movable permanent magnet so as to be rotatable and configuring the movable permanent magnet so as to be biased in the retarded angle direction by an elastic force enables self-adjustment of output torque characteristics and rotation speed characteristics by using feedback of the output torque.

At a time when the rotor supplied with the current starts to rotate, a reaction force in the direction opposite to rotation of the rotor acts on the movable permanent magnet. As a result, the movable permanent magnet is rotated in the advanced angle direction which is the direction opposite to the rotation direction of the rotor. Rotation of the movable permanent magnet in the advanced angle direction corresponds to, for example, displacement of the brush in the retarded angle direction in a motor in which the position of the movable permanent magnet is fixed. Accordingly, a high torque output is enabled under a low rotation speed at the time of starting the rotation.

As the rotation speed of the rotor increases, the output torque of the rotor decreases, and thus the reaction force acting on the movable permanent magnet decreases, too. As a consequence, the movable permanent magnet is rotated in the retarded angle direction by the elastic force. Rotation of the movable permanent magnet in the retarded angle direction corresponds to, for example, displacement of the brush in the advanced angle direction in a motor in which the position of the movable permanent magnet is fixed. Since an induced voltage at the high rotation speed becomes less influential, the rotation speed increases.

The present teaching is a teaching accomplished based on the findings that, in view of the design concept of changing the set position of the brush, dynamically changing the position of the movable permanent magnet enables improvement in output torque characteristics and rotation speed characteristics.

In the following, the present teaching will be described based on preferred embodiments with reference to the drawings.

FIG. 1 is a cross-sectional view showing an outline configuration of an engine start-up device S including a straddled vehicle starter motor according to a first embodiment of the present teaching.

Figure 9:
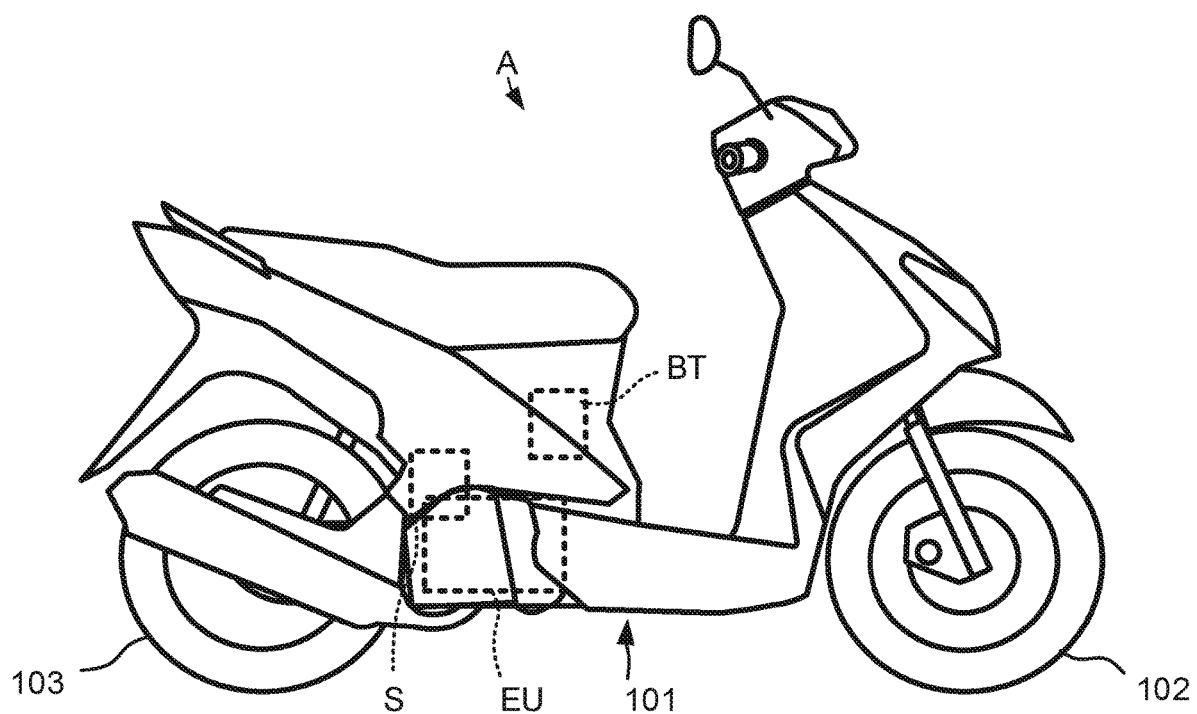
FIG. 9 shows an external appearance of a straddled vehicle equipped with the starter motor according to the first embodiment or the second embodiment.

The engine start-up device S shown in FIG. 1 is a device for starting up an engine EU (see FIG. 9) mounted to a straddled vehicle A (see FIG. 9). The engine start-up device S starts up the engine EU by rotating a crankshaft (not shown) of the engine EU under a state where the engine EU is stopped. Even after a combustion operation of the engine EU is started, the engine start-up device S drives the crankshaft in rotation to stabilize the operation of the engine EU.

The engine start-up device S includes a straddled vehicle starter motor 10 (or simply referred to as a starter motor 10), a reduction drive 30, an output shaft 40, and a housing 41. The starter motor 10 functions as a straddled vehicle starter motor that starts up the engine EU. The starter motor 10 is a brush motor.

The housing 41 of the engine start-up device S is, for example, fixed to the engine EU or the straddled vehicle A. The output shaft 40 of the engine start-up device S outputs a rotational force to the engine EU. The output shaft 40 of the engine start-up device S is driven in rotation by the starter motor 10.

The reduction drive 30, which is arranged between the starter motor 10 and the output shaft 40, transmits rotation of the starter motor 10 to the output shaft 40 while decelerating the rotation with a predetermined gear ratio. As the rotation of the starter motor 10 is decelerated, an output torque of the output shaft 40 increases. The engine start-up device S also includes a magnet switch 42 and a movable type gear 43. When the movable type gear 43 is moved in the axial direction of the output shaft and brought into engagement with a gear 50 of the engine EU by an effect of the magnet switch 42, rotation of the starter motor 10 is transmitted to the crankshaft through the gear 50.

The engine start-up device S may also be able to make the starter motor 10 generate power by transmitting a rotational force of the crankshaft to the starter motor 10 after the start-up of the engine EU is completed. The starter motor 10, which is a brush motor, generates a DC current.

Figure 2:
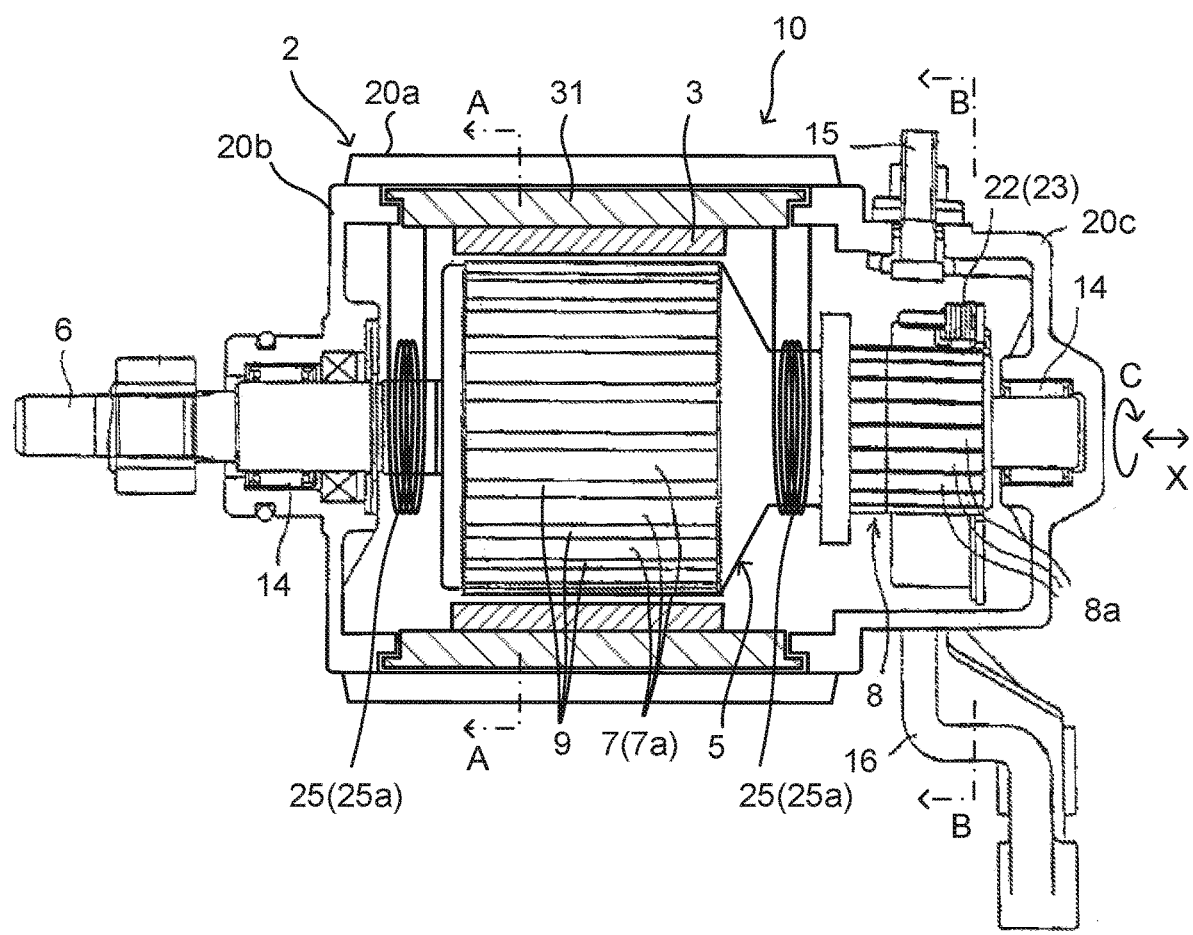
FIG. 2 is a cross-sectional view showing an outline structure of the starter motor according to the first embodiment of the present teaching.
Figure 3:
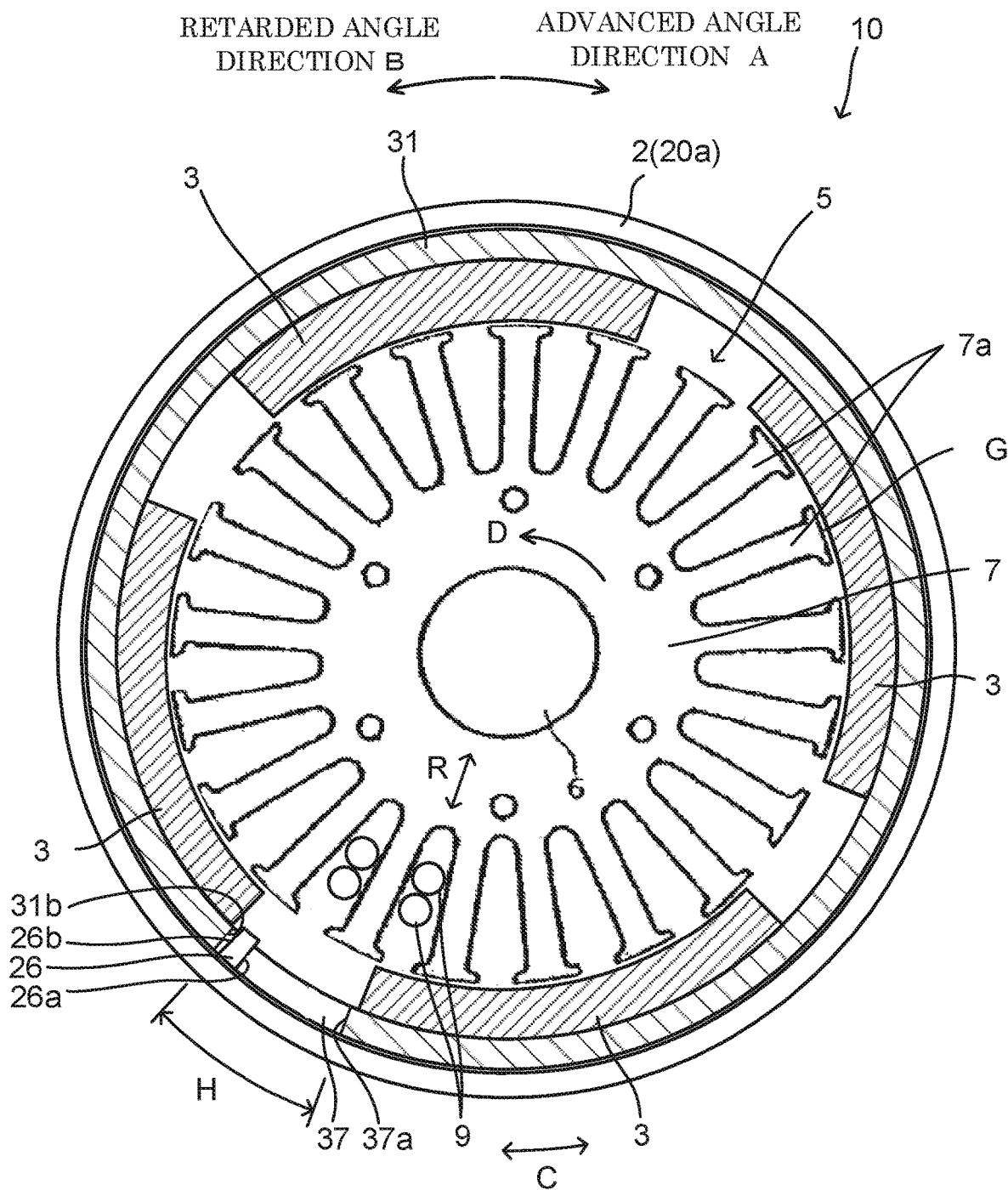
FIG. 3 is a cross-sectional view showing a cross-section of the starter motor of FIG. 2, as taken along the line A-A.
Figure 4:
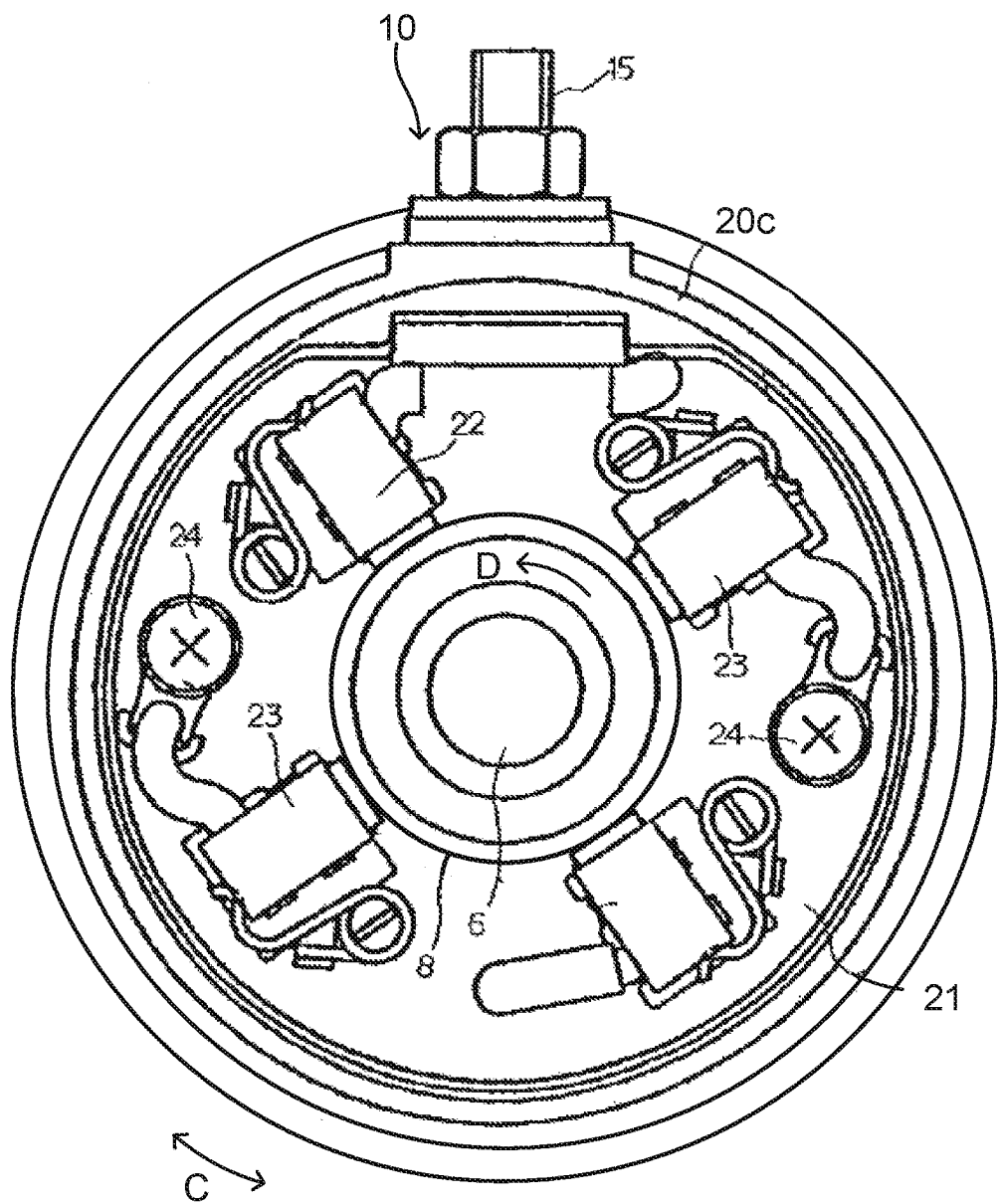
FIG. 4 is a cross-sectional view showing a cross-section of the starter motor of FIG. 2, as taken along the line B-B.

FIG. 2 is a cross-sectional view showing the starter motor 10 of FIG. 1 on an enlarged scale. FIG. 3 is a cross-sectional view showing a cross-section of the starter motor 10 of FIG. 2, as taken along the line A-A. FIG. 4 is a cross-sectional view showing a cross-section of the starter motor 10 of FIG. 2, as taken along the line B-B.

The starter motor 10 includes a housing 2, a rotor 5, fixed brushes 22, 23, movable permanent magnets 3, and a magnet moving unit 25.

The housing 2 of the starter motor 10 includes a cylindrical part 20a, a front covering 20b, and a rear covering 20c. The front covering 20b and the rear covering 20c are arranged so as to close openings at the opposite ends of the cylindrical part 20a. The cylindrical part 20a, the front covering 20b, and the rear covering 20c are fixed to one another by, for example, welding. The cylindrical part 20a, the front covering 20b, and the rear covering 20c may alternatively be fixed to one another by, for example, a fastening member. The housing 2 houses component parts of the starter motor 10, including the rotor 5, the fixed brushes 22, 23, movable permanent magnets 3, and the magnet moving unit 25. The housing 2 houses at least the rotor 5, the fixed brushes 22, 23, the movable permanent magnets 3, and the magnet moving unit 25. The housing 2 of the starter motor 10 constitutes a part of the housing 41 of the engine start-up device S shown in FIG. 1. Thus, the position of the housing 2 of the starter motor 10 is fixed relative to the engine EU and the straddled vehicle A.

The rotor 5 is supported on the housing 2 so as to be rotatable relative to the housing 2. The rotor 5 includes a rotation shaft 6, a core 7, a commutator 8, and windings 9. The core 7 is fixed to the rotation shaft 6. The rotation shaft 6 is fitted in the core 7 so as to penetrate the core 7. The rotation shaft 6 is supported on the housing 2 via a bearing 14. A rotational torque is caused in the rotor 5 by a current flowing in the windings 9. The rotor 5 is rotated by the current flowing in the windings 9. The rotation shaft 6, the core 7, the commutator 8, and the windings 9 are rotated integrally.

In the starter motor 10, the direction in which the rotation shaft 6 of the rotor 5 extends will be called an axis line direction X, and the direction perpendicular to the axis line direction X will be called a radial direction R. The direction along rotation of the rotor 5 will be called a circumferential direction C.

The core 7 is made of a magnetic material. The core 7 faces the movable permanent magnets 3 with a gap G therebetween. The starter motor 10 is a radial gap type motor, in which the core 7 and the movable permanent magnets 3 are opposed to each other in the radial direction R. The windings 9 are wound on the core 7. In more detail, the core 7 has a plurality of teeth 7a that extend from a central portion radially outward in the radial direction R. The plurality of teeth 7a are spaced by slots and arranged in the circumferential direction C. Each winding 9 is provided to pass through the slot, and wound on each tooth 7a to form a coil. The starter motor 10 of this embodiment adopts a distributed winding configuration in which one coil formed by the winding 9 surrounds a plurality of teeth 7a. The starter motor 10 may alternatively adopt a concentrated winding configuration.

The commutator 8 is arranged so as to enclose the rotation shaft 6, and electrically connected to the windings 9. The commutator 8 has contact pieces 8a, the number of which corresponds to the number of teeth 7a. The coils formed by the windings 9 are connected to the respective contact pieces 8a.

The fixed brushes 22, 23, by contacting the commutator 8, cause a current to flow in the rotor 5. The fixed brushes 22, 23 sequentially come into contact with the contact pieces 8a of the rotating commutator 8, so that the current flowing in the windings 9 is switched. That is, commutation of the windings 9 is caused.

The fixed brushes 22, 23 are provided to the housing 2 in such a manner that their positions are fixed with respect to the rotation direction of the rotor 5. More specifically, as shown in FIG. 4, a brush holder 21 having a plate-like shape is fixed to the rear covering 20c of the housing 2, and the fixed brushes 22, 23 are mounted on the brush holder 21. The starter motor 10 of this embodiment includes four fixed brushes 22, 23. The four fixed brushes 22, 23 are arranged side by side in the circumferential direction C. The fixed brushes 22 which serve as positive poles and the fixed brushes 23 which serve as negative poles are arranged adjacent to each other in the circumferential direction C. The fixed brushes 22, 23 are biased toward the commutator 8, and in contact with the commutator 8. The fixed brushes 22 serving as positive poles are electrically connected to a positive pole terminal 15, and the fixed brushes 23 serving as negative poles are electrically connected to a negative pole (ground) terminal 24 and grounded through a cable 16.

The starter motor 10 of this embodiment is a motor for outputting rotation in one direction. For example, the positive pole terminal 15 is electrically connected to a positive pole of a battery which is a DC power source while the negative pole terminal 24 is electrically connected to a negative pole of the battery, so that the rotor 5 of the starter motor 10 is rotated in a direction indicated by an arrow D of FIGS. 3 and 4.

The fixed brushes 22, 23 correspond to one example of the brush of the present teaching.

The movable permanent magnets 3 are arranged so as to face the core 7 with the gap G therebetween, as shown in FIG. 3. The movable permanent magnets 3 are arranged so as to directly face the core 7. The starter motor 10 of this embodiment includes four movable permanent magnets 3. The movable permanent magnets 3 are disposed outside the core 7 of the rotor 5 with respect to the radial direction R. The movable permanent magnets 3 are disposed at positions enclosing the core 7. The movable permanent magnets 3 are arranged such that the polarity repeatedly alternates between N pole and S pole in the circumferential direction C when viewed from the core 7.

The movable permanent magnets 3 are supported on the housing 2. The movable permanent magnets 3 are supported on the housing 2 so as to be movable in the circumferential direction C independently of the rotor 5. The movable permanent magnets 3 are movable in an angle range of an adjustment angle range H. The adjustment angle range H is a predetermined angle range where the movable permanent magnets 3 are movable. Due to magnetic effects exerted by the movable permanent magnets 3 and the rotor 5, the movable permanent magnets 3 move in the advanced angle direction relative to the fixed brushes 22, 23 within a period in which a current is supplied to the rotor.

The starter motor 10 of this embodiment includes a movable yoke part 31 disposed between the movable permanent magnets 3 and the housing 2. The plurality of movable permanent magnets 3 are fixed to the movable yoke part 31. The movable yoke part 31 is constituted of a magnetic body. The movable yoke part 31 has a cylindrical shape. The movable yoke part 31 is supported on the housing 2 so as to be rotatable in the circumferential direction C. The plurality of movable permanent magnets 3 are supported on the housing 2 via the movable yoke part 31. The movable permanent magnets 3 are supported on the housing 2 so as to be movable in the circumferential direction C independently of the rotor 5. As the movable yoke part 31 moves in the circumferential direction C, the movable permanent magnets 3 together with the movable yoke part 31 move in the circumferential direction C. A local deviation of a magnetic force is suppressed in a region opposite to the movable permanent magnets 3 relative to the movable yoke part 31, that is, in the outside of the movable yoke part 31 with respect to the radial direction R. Accordingly, when the movable permanent magnets 3 are moved, smooth movement of the movable permanent magnets 3 is obtained because a variation in a resistance force due to a deviation of the magnetic force that the movable permanent magnets 3 exert on the housing 2 is suppressed.

The housing 2 includes a limiting unit 26 that limits movement of the movable permanent magnets 3 farther than the adjustment angle range H. In the starter motor 10 of this embodiment, the limiting unit 26 is a protrusion that protrudes from the cylindrical part 20a of the housing 2 toward the center with respect to the radial direction R. The limiting unit 26 includes an advanced angle movement limiting unit 26a and a retarded angle movement limiting unit 26b. Thus, the starter motor 10 of this embodiment includes the advanced angle movement limiting unit 26a. The starter motor 10 also includes the retarded angle movement limiting unit 26b. In detail, the advanced angle movement limiting unit 26a is one edge of the limiting unit 26 with respect to the circumferential direction. The retarded angle movement limiting unit 26b is the other edge of the limiting unit 26 with respect to the circumferential direction. The movable yoke part 31 has a notch 37. The limiting unit 26 is disposed in the notch 37. The limiting unit 26 is disposed between end walls 37a and 37b that are provided on opposite sides of the notch 37 with respect to the circumferential direction. The limiting unit 26 limits movement of the movable permanent magnets 3 by limiting the rotation angle of the movable yoke part 31. The limiting unit 26 suppresses a situation where a trouble is caused in rotation of the rotor 5 due to excessive rotation of the movable permanent magnets 3. The advanced angle movement limiting unit 26a is configured to come into abutment with the end wall 37a of the movable yoke part 31 defining the notch 37, thus limiting movement of the movable permanent magnets 3 farther than the adjustment angle range H in an advanced angle direction A. The retarded angle movement limiting unit 26b is configured to come into abutment with the end wall 37b of the movable yoke part 31 defining the notch 37, thus limiting movement of the movable permanent magnets 3 farther than the adjustment angle range H in a retarded angle direction B. The advanced angle direction A is a direction opposite to a rotation direction D of the rotor 5 in which the rotor 5 rotates while being supplied with a current from the fixed brushes 22, 23. The retarded angle direction B is the same direction as the rotation direction D of the rotor.

Figure 5:
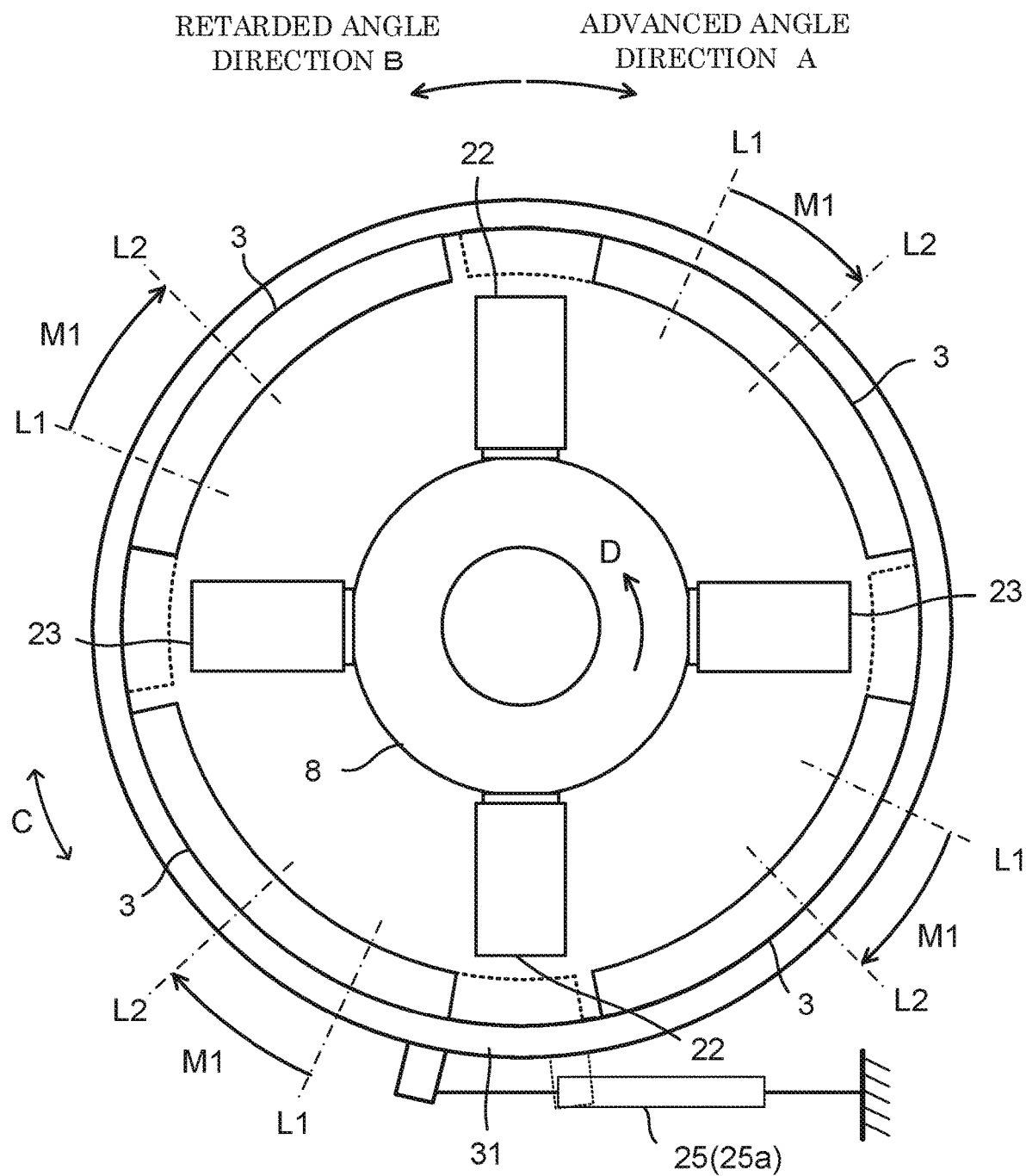
FIG. 5 is a schematic diagram showing a state where movable permanent magnets are in an advanced angle position.

The adjustment angle range H where the movable permanent magnets 3 are movable includes a retarded angle position (L1 in FIG. 6) and an advanced angle position (L2 in FIG. 5). The retarded angle position is such a position that the angle position of the movable permanent magnets 3 relative to the fixed brushes 22, 23 is displaced in the retarded angle direction B. Here, it is to be noted that, in a case where a certain position with respect to the circumferential direction is identified based on a direction of displacement relative to another position, the direction based on which the identification is made is a direction of displacement through a small central angle of two central angles formed by the two positions.

The starter motor 10 is configured such that an output torque of the starter motor 10 changes depending on the position of the movable permanent magnets 3 with respect to the circumferential direction C. The position of the movable permanent magnets 3 is an angle position relative to the fixed brushes 22, 23. A position of the movable permanent magnets 3 with respect to the circumferential direction at the highest output torque of the starter motor 10 will be referred to as a maximum torque position. When the movable permanent magnets 3 are in the maximum torque position, the output torque of the starter motor 10 is the maximum. As the movable permanent magnets 3 deviate from the maximum torque position, the output torque decreases. If the movable permanent magnets 3 are displaced by 90° in electrical angle from the maximum torque position in the advanced angle direction A, the output torque becomes almost zero. If the movable permanent magnets 3 are displaced by 90° in electrical angle from the maximum torque position in the retarded angle direction B, the output torque becomes almost zero. Here, the electrical angle is an angle obtained under a condition that the angle of each pole pair of the movable permanent magnets 3 corresponds to 360°. The retarded angle position and the advanced angle position are set within a range from a position corresponding to displacement by 90° in electrical angle relative to the maximum torque position in the retarded angle direction B to a position corresponding to displacement by 90° in electrical angle relative to the maximum torque position in the advanced angle direction A.

The retarded angle position is set within a range where a torque is outputted in the rotation direction of the rotor 5 in which the rotor 5 rotates while being supplied with a current. The advanced angle position is set within a range where the starter motor 10 outputs a torque in the rotation direction. That is, the advanced angle position and the retarded angle position are positions of the movable permanent magnets 3 where a torque is caused in the rotor 5 upon a current supply to the rotor 5. The advanced angle position and the retarded angle position can be set within a position range where a torque in the same direction is caused in the rotor 5 upon a current supply to the rotor 5. Each of the advanced angle position and the retarded angle position can, for example, be set within a range between 90° in the retarded angle direction and 90° in the advanced angle direction in electrical angle relative to a position where the maximum torque is caused in the rotor 5 upon a current supply to the rotor 5.

In such a case, the retarded angle position is a position that is set within a range from the position away from the maximum torque position toward the retarded angle direction B by 90° in electrical angle to the position away from the maximum torque position toward the advanced angle direction A by 90° in electrical angle. The advanced angle position is a position that is set within a range from the position away from the maximum torque position toward the retarded angle direction B by 90° in electrical angle to the position away from the maximum torque position toward the advanced angle direction A by 90° in electrical angle, and is a position displaced in the advanced angle direction from the retarded angle position.

Setting the retarded angle position and the advanced angle position within a range up to the position away from the maximum torque position toward the retarded angle direction B by 90° in electrical angle provides a higher stability of the current flowing in the fixed brushes 22, 23. In this case, the retarded angle position is a position that is set within a range from the maximum torque position to the position away from the maximum torque position toward the retarded angle direction B by 90° in electrical angle. The advanced angle position is a position that is set within a range from the maximum torque position to the position away from the maximum torque position toward the retarded angle direction B by 90° in electrical angle, and is a position displaced in the advanced angle direction from the retarded angle position.

In the starter motor 10, the "retarded angle position" is a position where the angle position of the movable permanent magnets 3 relative to the fixed brushes 22, 23 is displaced in the retarded angle direction B from the maximum torque position. The advanced angle position of the movable permanent magnets 3 is a position that is displaced in the advanced angle direction A from the retarded angle position. The retarded angle position of the movable permanent magnets 3 is a position that is displaced in the retarded angle direction B from the advanced angle position. In the circumferential direction C, the advanced angle position is closer to the maximum torque position than the retarded angle position is. The retarded angle position is more distant from the maximum torque position than the advanced angle position is. The advanced angle position may be substantially the same position as the maximum torque position. When the movable permanent magnets 3 are in the advanced angle position, a higher torque is caused in the rotor 5 than a torque caused in the retarded angle position.

The magnet moving unit 25 is configured to move the movable permanent magnets 3. The magnet moving unit 25 is configured to move the movable permanent magnets 3 in at least either one of the retarded angle direction B and the advanced angle direction A within the adjustment angle range H. The magnet moving unit 25 moves the movable permanent magnets 3 in the retarded angle direction B or in the advanced angle direction A within the adjustment angle range and within a period in which a current is supplied to the rotor 5.

The magnet moving unit 25 of the starter motor 10 of this embodiment includes an elastic member 25a. The elastic member 25a biases, with an elastic force, the movable permanent magnets 3 in the retarded angle direction B. The elastic member 25a is, for example, a spring coupled to the housing 2 and the movable yoke part 31. The elastic member 25a is, for example, a torsion spring. In the starter motor 10 of this embodiment, the elastic member 25a is configured such that the elastic force of the elastic member 25a is weaker than a reaction force of the rotor 5 that acts on the movable permanent magnets 3 at a time when the rotor 5 starts rotation. The elastic member 25a is also configured such that the elastic force of the elastic member 25a is stronger than a reaction force of the rotor 5 that acts on the movable permanent magnets 3 when the torque decreases along with an increase in the rotation speed of the rotor 5. For example, the elastic member 25a is configured such that, assuming that the movable permanent magnets 3 are fixed in the advanced angle position shown in FIG. 5, the elastic force of the elastic member 25a is stronger than the reaction force occurring when a rated load of the starter motor 10 is rotated at a rated speed.

Figure 6:
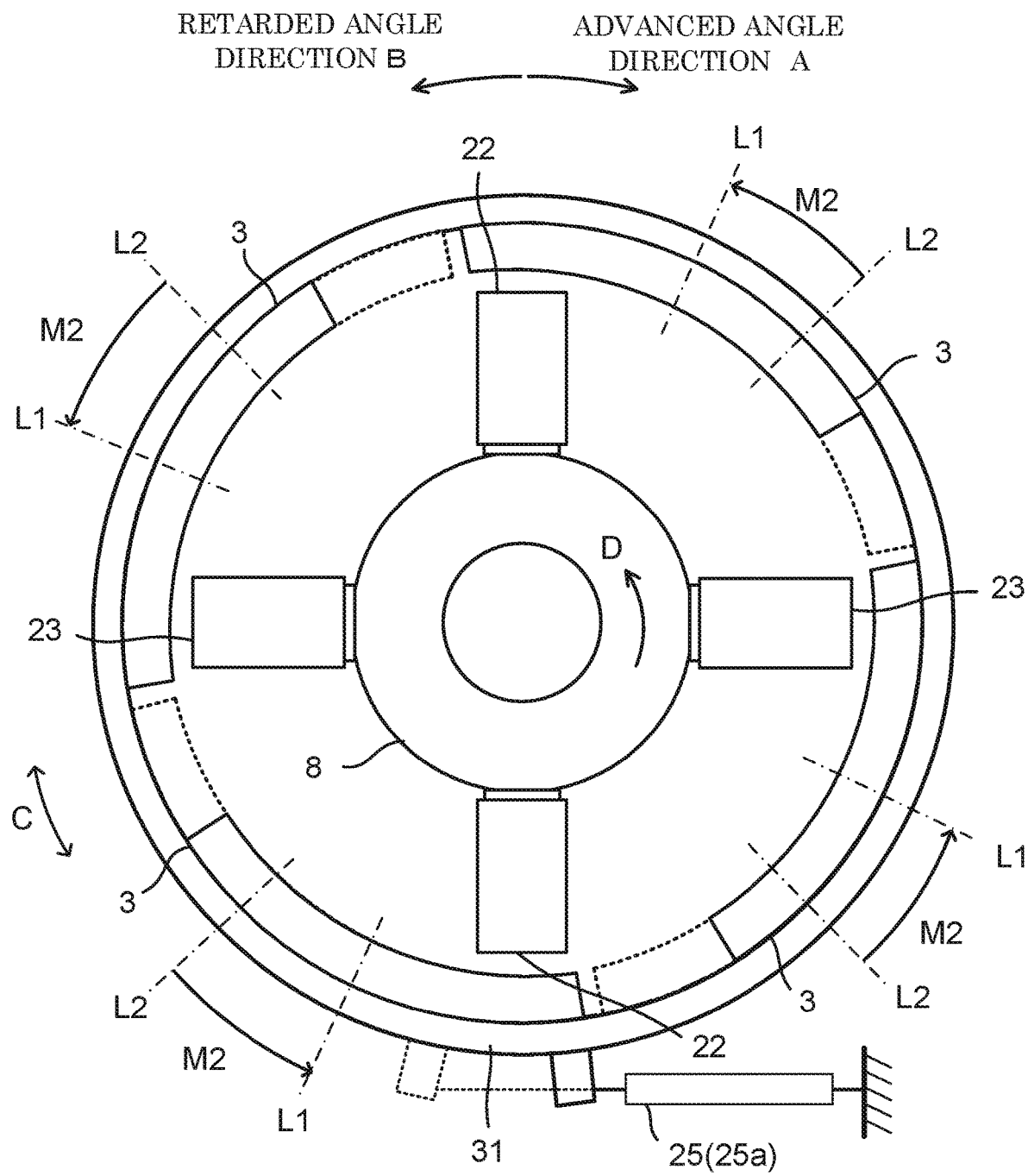
FIG. 6 is a schematic diagram showing a state where the movable permanent magnets are in a retarded angle position.

FIGS. 5 and 6 are schematic diagrams showing the positions of the fixed brushes 22, 23 and the movable permanent magnets 3 in the starter motor 10 shown in FIG. 4. The commutator 8 and the movable yoke part 31 are also shown in FIGS. 5 and 6. The elastic member 25a is also schematically shown in FIGS. 5 and 6.

In FIG. 5, the movable permanent magnets 3 in the advanced angle position L2 are illustrated with solid lines. In FIGS. 5 and 6, the position of each of the movable permanent magnets 3 is represented based on a center position of the movable permanent magnets 3 with respect to the circumferential direction C. In FIG. 5, as a reference, the movable permanent magnets 3 in the retarded angle position L1 are illustrated with broken lines.

In FIG. 6, the movable permanent magnets 3 in the retarded angle position L1 are illustrated with the solid lines.

The retarded angle position L1 is a position of the movable permanent magnets 3 relative to the fixed brushes 22, 23 being displaced in the retarded angle direction B from the advanced angle position L2.

The advanced angle direction A is the direction opposite to the rotation direction D of the rotor 5 in which the rotor 5 rotates while being supplied with a current from the fixed brushes 22, 23. The retarded angle direction B is the same direction as the rotation direction D of the rotor 5.

The advanced angle position L2 shown in FIG. 5 is a position of the movable permanent magnets 3 relative to the fixed brushes 22, 23 being displaced in the advanced angle direction A from the retarded angle position L1 shown in FIG. 6. The advanced angle position L2 shown in FIG. 5 is a position where a higher torque is caused in the rotor 5 than a torque caused in the retarded angle position L1. In the circumferential direction C, the advanced angle position L2 is closer to the maximum torque position than the retarded angle position L1 shown in FIG. 6 is. The advanced angle position L2 may be substantially the same position as the maximum torque position. It, however, may not be necessary that the advanced angle position L2 is substantially the same position as the maximum torque position, as long as the advanced angle position L2 is closer to the maximum torque position than the retarded angle position L1 is with respect to the circumferential direction C. In this case, the advanced angle position L2 may be located between the retarded angle position L1 and the maximum torque position. It, however, may be acceptable that the maximum torque position is located between the advanced angle position L2 and the retarded angle position L1.

The maximum torque position of the movable permanent magnets 3 is such a position that the phase of a current flowing in a winding 9 is substantially coincident with the phase of an interlinkage flux linking with the winding.

The maximum torque position of the movable permanent magnets 3 is such a position that, for example, an induced voltage caused between the fixed brushes 22, 23 is maximized in a case where the starter motor 10 functions as a power generator and is rotated by a rotational force supplied from the outside.

The relationship between the current phase and the magnetic flux phase is determined based on a relative position between the movable permanent magnets 3 and the fixed brushes 22, 23.

The retarded angle position L1 shown in FIG. 6 is a position reached when the position of the movable permanent magnets 3 relative to the fixed brushes 22, 23 is displaced in the retarded angle direction B from the advanced angle position L2 shown in FIG. 5.

From the viewpoint of a commutation timing of the winding 9, a state where the movable permanent magnets 3 are in the retarded angle position L1 is equivalent to, for example, a state where a brush is in the advanced angle position in a case where the brush is rotatable. More specifically, the state shown in FIG. 6 can be considered as a state where the position of the fixed brushes 22, 23 relative to the movable permanent magnets 3 is moved in the advanced angle direction A from the position where the maximum torque occurs.

Accordingly, when the movable permanent magnets 3 are located in the retarded angle position L1 shown in FIG. 6, as compared to in the advanced angle position L2, an induced voltage that is caused in a case of the starter motor 10 functioning as a power generator is lower. A torque at a time of activation in a case where the movable permanent magnets 3 are located in the retarded angle position L1 is lower than a torque at a time of activation in a case where the movable permanent magnets 3 are located in the advanced angle position L2.

Generally in a starter motor constituted of a brush motor, an output torque T, a magnetic flux $\Phi$, the number of poles P of the permanent magnets, the number of turns Z of the winding, and a current I satisfy the following relationship:

$$T \propto \Phi P Z I.$$

Specifically, $\Phi$ represents an interlinkage magnetic flux linking with a winding in which the current I flows. The current I is proportionate to a difference between a power source voltage of the starter motor and an induced voltage caused in the winding. The induced voltage caused in the winding is proportionate to a time derivative of the magnetic flux $\Phi$. As a result of movement of the movable permanent magnets 3 to the retarded angle position L1 in the brush motor 10 of this embodiment, the interlinkage flux $\Phi$ at a timing when the current I is supplied from the fixed brushes 22, 23 is reduced as compared to the case in the advanced angle position L2. The movement of the movable permanent magnets 3 to the retarded angle position L1, however, causes the induced voltage to be lowered. Therefore, a current can be supplied to the winding under a high rotation speed. That is, a rotation speed that can be output is high.

In the starter motor 10 of this embodiment, the adjustment angle range in a case of moving the movable permanent magnets 3 from the maximum torque position to the retarded angle position L1 is less than the right angle in electrical angle. In view of the stability of rotation, the adjustment angle range may be equal to or less than 30° in electrical angle. The electrical angle is an angle obtained under a condition that the angle of each pole pair of the movable permanent magnets 3 corresponds to 360°. Since the starter motor 10 of this embodiment includes two pairs of poles formed by the four movable permanent magnets 3 and the four fixed brushes 22, 23, the adjustment angle range H may be equal to or less than 15° in mechanical angle.

In the starter motor 10 of this embodiment, the magnet moving unit 25 moves the movable permanent magnets 3 in the retarded angle direction B or in the advanced angle direction A within the adjustment angle range H and within the period in which the rotor 5 is supplied with a current.

In more detail, at a time point when a current is supplied to the rotor 5 so that the rotor 5 starts rotation, the magnet moving unit 25 places the movable permanent magnets 3 in the advanced angle position L2 shown in FIG. 5. The magnet moving unit 25 moves the movable permanent magnets 3 in the retarded angle direction B to the retarded angle position L1, within a period in which the rotor 5 is rotating with the current supplied to the rotor 5.

Operations of the magnet moving unit 25 will be sequentially described, starting with a state where no current is supplied.

In the starter motor 10 of this embodiment, the elastic member 25a (see FIG. 2) of the magnet moving unit 25 biases, with an elastic force, the movable permanent magnets 3 in the retarded angle direction B. The elastic force of the elastic member 25a is weaker than a reaction force of the rotor 5 that acts on the movable permanent magnets 3 at a time when the rotor 5 starts rotation, and stronger than a reaction force of the rotor 5 that acts on the movable permanent magnets 3 when the torque decreases along with an increase in the rotation speed of the rotor 5.

In the state where no current is supplied to the rotor, the movable permanent magnets 3 are located in the retarded angle position L1 as shown in FIG. 6, due to a biasing force of the elastic member 25a in the retarded angle direction B.

The movable permanent magnets 3 are configured such that their position relative to the fixed brushes 22, 23 is moved in the advanced angle direction A due to the reaction force of the rotor 5 that acts on the movable permanent magnets 3 within a period in which a current is supplied to the rotor 5. Upon a current supply to the rotor 5, a rotational force in the retarded angle direction B occurs in the rotor 5. The rotational force is an output torque. The reaction force in the advanced angle direction A, which is reverse to the retarded angle direction B, acts on the movable permanent magnets 3. The reaction force makes the movable permanent magnets 3 move in the advanced angle direction A. To be specific, in this embodiment, a reaction force stronger than the elastic force of the elastic member 25a acts on the movable permanent magnets 3, so that the movable permanent magnets 3 move in the advanced angle direction A. The elastic member 25a of the magnet moving unit 25 allows the movable permanent magnets 3 to move to the advanced angle position in a period from when a current supply to the rotor 5 is started to when the rotor 5 rotates. When the movable permanent magnets 3 are allowed to move to the advanced angle position, the movable permanent magnets 3 start to move in the advanced angle direction A due to the reaction force of the rotor 5 acting on the movable permanent magnets 3. In a case where, for example, the starter motor 10 is operated with a voltage supplied from a battery configured to output a rated voltage, the maximum output torque normally occurs in a period from when a current supply is started to when the rotor 5 rotates. Accordingly, the reaction of the output torque acting on the movable permanent magnets 3 is also maximized in the period from when a current supply is started to when the rotor 5 rotates. At this time, movement of the movable permanent magnets 3 in the advanced angle direction A is started, as indicated by an arrow M1 in FIG. 5.

When the movable permanent magnets 3 are moved in the advanced angle direction A and located in the advanced angle position L2 shown in FIG. 5, a higher torque is caused in the rotor 5 than a torque caused in the retarded angle position shown in FIG. 6. The starter motor 10 is able to start rotation with a higher torque, as compared to when the movable permanent magnets 3 are located in the retarded angle position L1 shown in FIG. 6.

The advanced angle movement limiting unit 26a (see FIG. 3) comes into abutment with the end wall 37a of the movable yoke part 31 defining the notch 37, thus limiting movement of the movable permanent magnets 3 farther than the adjustment angle range H in the advanced angle direction A. The advanced angle movement limiting unit 26a (see FIG. 3) limits movement of the movable permanent magnets 3 farther than the advanced angle position L2 in the advanced angle direction A. This can suppress a situation where the output torque decreases due to excessive movement of the movable permanent magnets 3.

The elastic member 25a is configured such that, when the torque decreases as the rotation speed of the rotor 5 increases, the movable permanent magnets 3 located in the advanced angle position L2 shown in FIG. 5 are moved in the retarded angle direction B by the biasing force of the elastic member 25a. After the rotor 5 starts rotation, the output torque of the rotor 5 decreases as the rotation speed of the rotor 5 increases, so that the reaction force of the rotor 5 acting on the movable permanent magnets 3 also decreases. Here, the elastic force of the elastic member 25a is stronger than the reaction force of the rotor 5 that acts on the movable permanent magnets 3 when the torque decreases as the rotation speed of the rotor 5 increases. Therefore, the magnet moving unit 25 moves the movable permanent magnets 3 in the retarded angle direction B to the retarded angle position L1 shown in FIG. 6 within the period in which the rotor 5 is rotating with the current supplied to the rotor 5. The movable permanent magnets 3 are moved in the retarded angle direction B, as indicated by an arrow M2 in FIG. 6. In more detail, the magnet moving unit 25 moves the movable permanent magnets 3 in the retarded angle direction B to the retarded angle position L1 shown in FIG. 6, based on an increase in the rotation speed of the rotor 5. Generally, for example, the output torque decreases based on an increase in the rotation speed of the rotor 5, and thus the reaction force of the rotor 5 acting on the movable permanent magnets 3 also decreases in accordance with the increase in the rotation speed of the rotor 5. The elastic force of the elastic member 25a is set so as to gradually weaken as the distance through which the elastic member 25a moves the movable permanent magnets 3 becomes longer. Here, the relationship between the elastic force (loading) of the elastic member 25a and the distance through which the elastic member 25a moves the movable permanent magnets 3 may be linear (in direct proportion), substantially linear, or non-linear. Setting a variation range of the elastic force of the elastic member 25a so as to overlap a variation range of the reaction force acting on the movable permanent magnets 3 allows the magnet moving unit 25 to gradually move the movable permanent magnets 3 based on an increase in the rotation speed of the rotor 5. As a result, this embodiment can, for example, gradually shift the rotation speed characteristics and output torque characteristics of the starter motor 10 from one indicated by a solid line P to one indicated by a solid line Q in FIG. 7. In this embodiment, rotation speed characteristics and output torque characteristics can be changed continuously.

From the viewpoint of a commutation timing of the winding, movement of the movable permanent magnets 3 to the retarded angle position L1 shown in FIG. 6 is equivalent to, for example, movement of a brush to the advanced angle position in a case where the brush is rotatable. Accordingly, movement of the movable permanent magnets 3 to the retarded angle position L1 makes the induced voltage less influential. A delay in a change of the current flowing in the winding 9 along with an increase in the rotation speed, which delay is caused by an inductance of the winding 9, is also made less influential by the movement of the movable permanent magnets 3 to the retarded angle position L1. Thus, the rotation speed of the rotor increases. The retarded angle movement limiting unit 26b (see FIG. 3) comes into abutment with the end wall 37b of the movable yoke part 31 defining the notch 37, thus limiting movement of the movable permanent magnets 3 farther than the adjustment angle range H in the retarded angle direction B. The retarded angle movement limiting unit 26b (see FIG. 3) limits movement of the movable permanent magnets 3 farther than the retarded angle position L1 in the retarded angle direction B. This can suppress a situation where the output torque decreases due to excessive movement of the movable permanent magnets 3.

Figure 7:
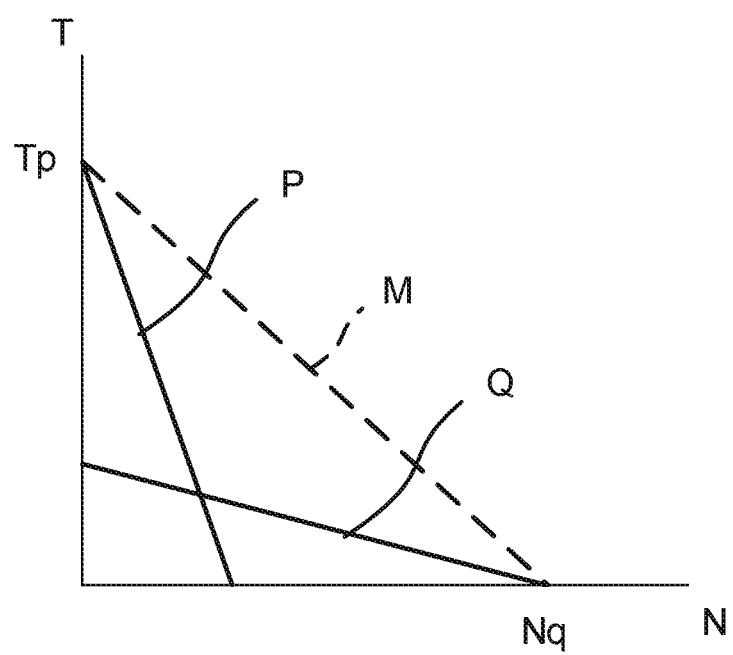
FIG. 7 is a graph schematically showing rotation speed characteristics and output torque characteristics of the starter motor shown in FIG. 3.

FIG. 7 contains a graph schematically showing rotation speed characteristics and output torque characteristics of the starter motor 10 shown in FIG. 3. In FIG. 7, the solid line P indicates characteristics obtained when the movable permanent magnets 3 are located in the advanced angle position L2 shown in FIG. 5, and the solid line Q indicates characteristics obtained when the movable permanent magnets 3 are located in the retarded angle position L1 shown in FIG. 6.

The output torque T of the starter motor 10, in general, decreases as a rotation speed N increases.

When the movable permanent magnets 3 are located in the advanced angle position L2 shown in FIG. 5, a relatively high output torque is outputted under a low rotation speed, as indicated by the solid line P. For example, a relatively high output torque Tp can be outputted at a time of starting rotation. When the movable permanent magnets 3 are located in the advanced angle position L2 shown in FIG. 5, however, a relatively rapid decrease in the torque occurs along with an increase in the rotation speed. As a result, a rotation speed that can be output is relatively low.

When the movable permanent magnets 3 are located in the retarded angle position L1 shown in FIG. 6, a relatively low output torque is obtained under a low rotation speed. On the other hand, a decrease in the torque along with an increase in the rotation speed is gentle, and thus a rotation speed that can be output is relatively high. For example, a high rotation speed Nq is obtained under an unloaded state.

In the starter motor 10 of this embodiment, the movable permanent magnets 3 are located in the advanced angle position L2 shown in FIG. 5 at a time point when the rotor 5 starts rotation upon a current supply to the rotor 5.

This can provide an increased output torque, as indicated by the solid line P in FIG. 7. Then, within the period in which the rotor 5 is rotating with the current supplied to the rotor 5, the movable permanent magnets 3 are moved in the retarded angle direction B to the retarded angle position L1. This can improve the rotation speed that can be output, as indicated by the solid line Q in FIG. 7. That is, in the starter motor 10 of this embodiment, the rotation speed characteristics and the output torque characteristics are changed from the characteristics indicated by the solid line P to the characteristics indicated by the solid line Q in FIG. 7, within the period in which the rotor is rotating.

Examples of a starter motor capable of outputting both the output torque Tp and the rotation speed that can be output Nq in the graphs of FIG. 7 without moving the position of the movable permanent magnets include a starter motor having characteristics indicated by a broken line M. In order that a starter motor can have the characteristics indicated by the broken line M, for example, it is necessary to: reduce the number of turns of a winding for the purpose of suppressing an influence of the induced voltage and increase the thickness of the winding such that a torque can be ensured even though the number of turns is reduced; or increase a magnetic force of a magnet. This results in a size increase of the starter motor, which deteriorates mountability to a straddled vehicle. In addition, power consumption of a battery increases.

Moving the position of the brush instead of moving the movable permanent magnets 3 is also conceivable as alternative means for adjusting a current commutation timing. Here, the brush is a member that supplies a current to the rotor while being in contact with the rotating rotor, as shown in FIG. 4 for example. A conductor such as a wire is connected to the brush. Configuring a brush, to which a conductor (lead wire) is connected, so as to be movable while being appropriately kept in contact with a commutator for supplying a current leads to a complicated structure.

In the starter motor 10 of this embodiment, both an operation state that provides an improved output torque under a low rotation speed and an operation state that increases the rotation speed when the torque is low can be achieved by movement of the movable permanent magnets 3, without movement of the fixed brushes 22, 23. Accordingly, the starter motor 10 can improve output torque characteristics and rotation speed characteristics for starting up the engine EU (see FIG. 9) with a simple configuration, while improving mountability to the straddled vehicle A (see FIG. 9).

When starting up the engine EU (see FIG. 9), the starter motor 10 rotates the crankshaft of the engine EU that has been stopped. At this time, the starter motor 10 is able to improve the output torque under a low rotation speed. After the combustion operation of the engine EU is started, the output torque decreases along with an increase in the rotation speed. At this time, the starter motor 10 can stabilize the operation of the engine EU by rotating the crankshaft of the engine EU at a high rotation speed.

In the engine start-up device S already described with reference to FIG. 1, rotation of the starter motor 10 is decelerated by the reduction drive 30 such that an increased rotation torque can be transmitted to the engine EU (see FIG. 9). The starter motor 10 of this embodiment, which provides an improved output torque, can decrease a speed reduction ratio of the reduction drive 30, thus suppressing a driving noise.

In the starter motor 10 of this embodiment, the movable permanent magnets 3 are located in the advanced angle position at a time point when the rotor 5 starts rotation upon a current supply to the rotor 5, so that the output torque can be improved at the time point when the rotation is started, as indicated by the solid line P in FIG. 7. Then, within the period in which the rotor 5 is rotating with the current supplied to the rotor 5, the movable permanent magnets 3 are moved in the retarded angle direction B to the retarded angle position L1, which can improve the rotation speed as indicated by the solid line Q in FIG. 7.

Examples of a brush motor not having a movable permanent magnet include a fixed type brush motor including a position-fixed permanent magnet and three or more brushes disposed in different positions. The positions of the three or more brushes of the fixed-type brush motor are fixed. In the fixed-type brush motor, a brush adopted to supply a current is switched from one brush to another brush, for changing characteristics. In such a fixed-type brush motor, however, the characteristics are limited by the number of brushes. In addition, the characteristics are changed discontinuously by the switching.

The magnet moving unit 25 of the starter motor 10 moves the movable permanent magnets 3 in the retarded angle direction B to the retarded angle position L1 (see FIG. 6) based on an increase in the rotation speed of the rotor 5, within the period in which the rotor 5 is rotating with the current supplied to the rotor 5. Accordingly, the starter motor 10 can smoothly widen the rotation speed range of the rotor.

The magnet moving unit 25 of the starter motor 10 uses the elastic force of the elastic member 25a as a force for biasing the movable permanent magnets 3 in the retarded angle direction. This enables the starter motor 10 to improve output torque characteristics and rotation speed characteristics with a configuration simpler than, for example, using an actuator or a control device.

The elastic force of the elastic member 25a of the starter motor 10 is weaker than the reaction force of the rotor that acts on the movable permanent magnets 3 at a time when the rotor 5 starts rotation. At the time when the rotor 5 starts rotation, therefore, the movable permanent magnets 3 are moved in the advanced angle direction A by the reaction force of the rotor. Thus, the output torque can be increased at the time when the rotor 5 starts rotation. The elastic force of the elastic member 25a of the starter motor 10 is stronger than the reaction force of the rotor 5 that acts on the movable permanent magnets 3 when the torque decreases along with an increase in the rotation speed of the rotor 5. As a result, the movable permanent magnets 3 are moved in the retarded angle direction B by the elastic force along with an increase in the rotation speed of the rotor 5. Thus, the rotation speed can be improved. This way, in the starter motor 10, the movement of the movable permanent magnets 3 in the advanced angle direction A and in the retarded angle direction B is implemented as a self-adjustment function using the elastic force of the elastic member 25a and the reaction force of the rotor 5.

Second Embodiment

Next, a second embodiment of the present teaching will be described.

Figure 8:
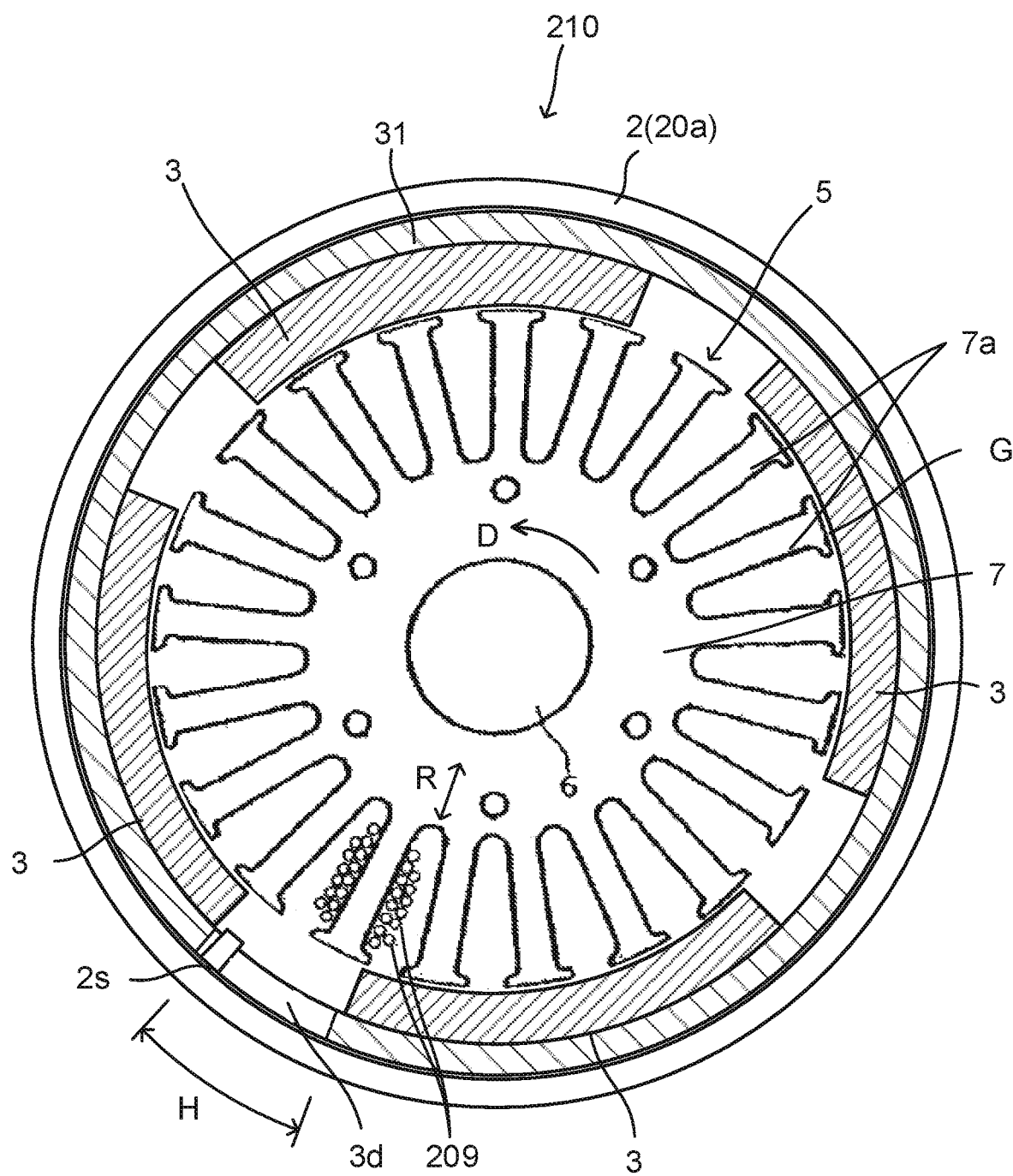
FIG. 8 is a cross-sectional view of a starter motor according to a second embodiment of the present teaching, as comparable to FIG. 3.

FIG. 8 is a cross-sectional view of a starter motor according to a second embodiment of the present teaching, as comparable to FIG. 3.

A starter motor 210 shown in FIG. 8 is, like that of the first embodiment, provided in an engine start-up device S (see FIG. 2).

In the starter motor 210 shown in FIG. 8, the number of turns of each winding 209 wound on each tooth 7a is greater than the number of turns in the starter motor 10 (see FIG. 3) according to the first embodiment. That is, the number of times the winding 209 passes through the slot between the teeth 7a is greater than that in the starter motor 10 (see FIG. 3) according to the first embodiment.

In the starter motor 210 shown in FIG. 8, the number of turns of each winding 209 wound on each tooth 7a is greater, and accordingly an output torque at a time when the rotor 5 starts rotation can be maintained with a small current. This means that power consumption of the battery can be suppressed. In the starter motor 210 shown in FIG. 8, the number of turns of each winding 209 wound on each tooth 7a is greater, and therefore the rate of increase in the induced voltage along with an increase in the rotation speed is high. In this respect, the starter motor 210 according to the second embodiment of the present teaching is able to increase the output torque at a time point when the rotor 5 starts rotation. In the starter motor 210, the movable permanent magnets 3 are moved in the retarded angle direction B to the retarded angle position L1 (see FIG. 6) within a period in which the rotor 5 is rotating with the current supplied to the rotor 5. Thus, the rotation speed can be improved. Accordingly, a decrease in the rotation speed that can be output is suppressed.

[Straddled Vehicle]

FIG. 9 shows an external appearance of a straddled vehicle equipped with the starter motor 10, 210 according to the first embodiment or the second embodiment.

A straddled vehicle A shown in FIG. 9 is a motorcycle. The vehicle of the present teaching, however, is not limited to motorcycles. Examples of the vehicle of the present teaching include scooter, moped, off-road, and on-road type motorcycles. The straddled vehicle is not limited to motorcycles, and for example, may be an ATV (All-Terrain Vehicle), etc. The straddled vehicle A includes the engine start-up device S of the first or second embodiment described above, and the engine EU configured to be started up by the engine start-up device S. The straddled vehicle A includes a vehicle body 101, wheels 102, 103, and a battery BT. The engine EU mounted to the straddled vehicle A is configured to drive the wheel 103 which is a drive wheel, to rotate the wheel 103, thus making the straddled vehicle A travel.

At a time of starting up the engine EU, the engine start-up device S starts up the engine EU with power of the battery BT. The starter motor 10, 210 (see FIG. 3 or FIG. 8) of the engine start-up device S is able to increase the output torque at a time point when rotation starts, and able to increase the rotation speed by moving the movable permanent magnets 3 in the retarded angle direction B to the retarded angle position within the period in which the rotor 5 is rotating with the current supplied to the rotor 5.

The straddled vehicle A has the engine start-up device S provided with the above-described starter motor 10, 210. Accordingly, the straddled vehicle A can improve start-up properties of the engine EU while improving mountability of the engine start-up device S to a vehicle.

Although the embodiments of the starter motor 10 described above illustrate the magnet moving unit 25 including the elastic member 25a as an example of the magnet moving unit of the present teaching, this does not limit the present teaching. The magnet moving unit of the present teaching may be configured to, for example, move a permanent magnet with an actuator or a motor. In such a configuration, for example, the magnet moving unit may be provided with a sensor that detects the rotation speed of the rotor, and the permanent magnet may be moved in accordance with the detected rotation speed. The magnet moving unit may be provided with a sensor that detects the output torque of the rotor, and the permanent magnet may be moved in accordance with the detected torque.

It suffices that the magnet moving unit ensures that the movable permanent magnet is located in the advanced angle position at a time point when the rotor starts rotation, and moving the movable permanent magnet to the advanced angle position may not always be necessary.

In the embodiments described above, the configuration that moves the movable permanent magnets 3 in the retarded angle direction to the retarded angle position based on an increase in the rotation speed of the rotor 5 is illustrated as an example of the magnet moving unit of the present teaching. Alternatively, for example, the magnet moving unit of the present teaching may be provided with a sensor that detects whether or not the rotor is rotating, and the permanent magnet may be moved upon elapse of a predetermined period after detection of rotation.

The straddled vehicle starter motor of the present teaching may be configured such that the movable permanent magnet is moved manually. The movable permanent magnet, however, is configured to be moved at least not manually. The magnet moving unit of the straddled vehicle starter motor of the present teaching is configured to move the movable permanent magnet with an elastic member, an actuator, a motor, or the like, instead of a manual force. That is, the magnet moving unit of the present teaching is not configured to move the movable permanent magnet with a manual force. The straddled vehicle starter motor of the present teaching may be configured such that, while the movable permanent magnet is moving within an angle range including the retarded angle position and the advanced angle position, the circumferential length or area over which the movable permanent magnet is opposed to the core (rotor) with a gap therebetween can be kept constant. In other words, the magnet moving unit of the present teaching may be configured to move the movable permanent magnet while keeping constant the circumferential length or area over which the movable permanent magnet and the core are opposed to each other. In addition, the straddled vehicle starter motor of the present teaching may be configured such that the movable permanent magnet is not allowed to move in the axial direction or in the radial direction.

The magnet moving unit of the present teaching may constantly bias the permanent magnet similarly to the magnet moving unit including the elastic member 25a, or alternatively may bias the permanent magnet only while the permanent magnet is moving in the retarded angle direction.

Although the embodiments illustrate the configuration including the retarded angle movement limiting unit 26b as an example of the brush motor, the brush motor of the present teaching is not limited thereto. For example, movement of the movable permanent magnet may be substantially limited by using a configuration in which the elastic force of the elastic member decreases along with movement of the movable permanent magnet in the retarded angle direction, so that the movable permanent magnet is stopped in a predetermined range.

Although the embodiments illustrate the configuration including the advanced angle movement limiting unit 26a as an example of the brush motor, the brush motor of the present teaching is not limited thereto. For example, movement of the movable permanent magnet may be substantially limited by using a configuration in which: before the rotor rotates with a current supply via the fixed brush, the movable permanent magnet is moved farther than the maximum torque position in the advanced angle direction by a reaction, so that the reaction decreases; and the movement of the movable permanent magnet is stopped at a position where a friction force of the movement of the movable permanent magnet is balanced with the reaction.

Although the embodiments illustrate the movable permanent magnets 3 supported on the housing 2 via the movable yoke part 31 as an example of the movable permanent magnet, this does not limit the present teaching. For example, the movable permanent magnet of the present teaching may be directly supported on the housing. For example, the movable permanent magnet may be supported on the housing via a member different from the magnetic material.

Although the embodiments illustrate the starter motor 10 including the four fixed brushes 22, 23 and the four movable permanent magnets 3 as an example of the straddled vehicle starter motor, the starter motor of the present teaching is not limited thereto. For example, the straddled vehicle starter motor may include less than four fixed brushes and less than four movable permanent magnets, or may include more than four fixed brushes and more than four movable permanent magnets.

Although the embodiments illustrate the fixed brushes 22, 23 as an example of the brush, this does not limit the present teaching. For example, the starter motor of the present teaching may include both a brush that is movable in the circumferential direction of the rotor and a movable permanent magnet that is movable in the circumferential direction of the rotor.

Although the embodiments illustrate the starter motor 10 of radial gap type as an example of the starter motor, the straddled vehicle starter motor of the present teaching is not limited thereto. For example, the straddled vehicle starter motor may be of axial gap type.

Although the embodiments illustrate the starter motor 10 for outputting rotation in one direction as an example of the straddled vehicle starter motor, the straddled vehicle starter motor of the present teaching is not limited thereto. For example, the straddled vehicle starter motor may be a motor configured to rotate in a reverse direction in accordance with electrode connection.

Although the embodiments illustrate the engine start-up device that makes the starter motor 10 generate power as an example of the engine start-up device, the engine start-up device and the straddled vehicle starter motor of the present teaching are not limited thereto. For example, the engine start-up device may disconnect the engine from the straddled vehicle starter motor after completing start-up of the engine.

REFERENCE SIGNS LIST 10, 210 straddled vehicle starter motor (starter motor)
26 limiting unit
2 housing
3 movable permanent magnet
5 rotor
8 commutator
9, 209 winding
22, 23 fixed brush
25 magnet moving unit
25a elastic member 26a advanced angle movement limiting unit
26b retarded angle movement limiting unit
31 movable yoke part
EU engine
S engine start-up device
A straddled vehicle

The invention claimed is:

1. A straddled vehicle starter motor for starting up an engine mounted to a straddled vehicle, the straddled vehicle starter motor comprising:
   a rotor configured to be rotatable, and including
      a winding,
      a core with the winding wound thereon, and
      a commutator electrically connected to the winding;
   a brush configured to contact the commutator to cause a current to be supplied to the rotor, a position of the brush being fixed with respect to a rotation direction of the rotor; and
   a movable permanent magnet arranged to oppose the core with a gap therebetween and to be movable in a circumferential direction of the rotor, independently of the rotor, within an angle range, the angle range including
      a retarded angle position in which the movable permanent magnet is displaced in a retarded angle direction relative to the brush, to thereby cause a first torque, and
      an advanced angle position in which the movable permanent magnet is displaced in an advanced angle direction relative to the brush,
   to thereby cause a second torque that is higher than the first torque, the movable permanent magnet being configured to be located in the advanced angle position at a time point when the rotor starts to rotate upon a supply of the current to the rotor, and to be moved in the retarded angle direction to the retarded angle position within a first period in which the rotor is rotating with the current supplied to the rotor.

2. The straddled vehicle starter motor according to claim 1, wherein
   the movable permanent magnet is configured to be moved in the advanced angle direction relative to the brush by a reaction force of the rotor that acts on the movable permanent magnet at least within a second period in which the current is supplied to the rotor.

3. The straddled vehicle starter motor according to claim 2, further comprising an advanced angle movement limiting unit configured to prevent the movable permanent magnet from moving beyond the angle range in the advanced angle direction.

4. The straddled vehicle starter motor according to claim 2, further comprising a retarded angle movement limiting unit configured to prevent the movable permanent magnet from moving beyond the angle range in the retarded angle direction.

5. The straddled vehicle starter motor according to claim 2, further comprising a magnet moving unit configured
   to set the movable permanent magnet in the advanced angle position at the time point when the rotor starts to rotate upon the supply of the current to the rotor, and
   to move the movable permanent magnet in the retarded angle direction to the retarded angle position within the first period.

6. An engine start-up device that starts up an engine mounted to a straddled vehicle, the engine start-up device comprising:
   the straddled vehicle starter motor according to claim 2; and
   a reduction drive connected to the rotor, and configured to transmit rotation of the rotor to the engine while decelerating the rotation.

7. The straddled vehicle starter motor according to claim 1, further comprising an advanced angle movement limiting unit configured to prevent the movable permanent magnet from moving beyond the angle range in the advanced angle direction.

8. The straddled vehicle starter motor according to claim 7, further comprising a retarded angle movement limiting unit configured to prevent the movable permanent magnet from moving beyond the angle range in the retarded angle direction.

9. The straddled vehicle starter motor according to claim 7, further comprising a magnet moving unit configured
   to set the movable permanent magnet in the advanced angle position at the time point when the rotor starts to rotate upon the supply of the current to the rotor, and
   to move the movable permanent magnet in the retarded angle direction to the retarded angle position within the first period.

10. An engine start-up device that starts up an engine mounted to a straddled vehicle, the engine start-up device comprising:
    the straddled vehicle starter motor according to claim 7; and
    a reduction drive connected to the rotor, and configured to transmit rotation of the rotor to the engine while decelerating the rotation.

11. The straddled vehicle starter motor according to claim 1, further comprising a retarded angle movement limiting unit configured to prevent the movable permanent magnet from moving beyond the angle range in the retarded angle direction.

12. The straddled vehicle starter motor according to claim 11, further comprising a magnet moving unit configured
    to set the movable permanent magnet in the advanced angle position at the time point when the rotor starts to rotate upon the supply of the current to the rotor, and
    to move the movable permanent magnet in the retarded angle direction to the retarded angle position within the first period.

13. An engine start-up device that starts up an engine mounted to a straddled vehicle, the engine start-up device comprising:
    the straddled vehicle starter motor according to claim 11; and
    a reduction drive connected to the rotor, and configured to transmit rotation of the rotor to the engine while decelerating the rotation.

14. The straddled vehicle starter motor according to claim 1, further comprising a magnet moving unit configured
    to set the movable permanent magnet in the advanced angle position at the time point when the rotor starts to rotate upon the supply of the current to the rotor, and
    to move the movable permanent magnet in the retarded angle direction to the retarded angle position within the first period.

15. The straddled vehicle starter motor according to claim 14, wherein
    the magnet moving unit moves the movable permanent magnet in the retarded angle direction to the retarded angle position based on an increase in a rotation speed of the rotor within the first period.

16. The straddled vehicle starter motor according to claim 15, wherein
the magnet moving unit includes an elastic member that biases the movable permanent magnet in the retarded angle direction with an elastic force.

17. The straddled vehicle starter motor according to claim 15, further comprising a housing that houses at least the rotor, the brush, the movable permanent magnet, and the magnet moving unit, wherein
the rotor is rotatably supported by the housing,
the brush is provided to the housing such that the position of the brush with respect to the rotation direction of the rotor is fixed, and
the movable permanent magnet is supported by the housing so as to be movable in the circumferential direction of the rotor independently of the rotor.

18. An engine start-up device that starts up an engine mounted to a straddled vehicle, the engine start-up device comprising:
the straddled vehicle starter motor according to claim 15; and
a reduction drive connected to the rotor, and configured to transmit rotation of the rotor to the engine while decelerating the rotation.

19. The straddled vehicle starter motor according to claim 14, wherein
the magnet moving unit includes an elastic member that biases the movable permanent magnet in the retarded angle direction with an elastic force.

20. The straddled vehicle starter motor according to claim 19, wherein
the elastic force of the elastic member is weaker than a reaction force of the rotor that acts on the movable permanent magnet at the time point when the rotor starts to rotate and stronger than the reaction force of the rotor that acts on the movable permanent magnet when a torque decreases along with an increase in a rotation speed of the rotor.

21. The straddled vehicle starter motor according to claim 20, wherein
before the supply of the current to the rotor is started, the movable permanent magnet is located in the retarded angle position by a biasing force that the elastic member exerts in the retarded angle direction, and
the elastic member is configured to allow the movable permanent magnet to
move to the advanced angle position such that movement of the movable permanent magnet in the advanced angle direction by a reaction force of the rotor that acts on the movable permanent magnet is started within a third period from when the supply of the current to the rotor is started to when the rotor rotates, and
move the movable permanent magnet located in the advanced angle position in the retarded angle direction by the biasing force of the elastic member when a torque decreases along with the increase in a rotation speed of the rotor.

22. The straddled vehicle starter motor according to claim 20, further comprising a housing that houses at least the rotor, the brush, the movable permanent magnet, and the magnet moving unit, wherein
the rotor is rotatably supported by the housing,
the brush is provided to the housing such that the position of the brush with respect to the rotation direction of the rotor is fixed, and
the movable permanent magnet is supported by the housing so as to be movable in the circumferential direction of the rotor independently of the rotor.

23. An engine start-up device that starts up an engine mounted to a straddled vehicle, the engine start-up device comprising:
the straddled vehicle starter motor according to claim 20; and
a reduction drive connected to the rotor, and configured to transmit rotation of the rotor to the engine while decelerating the rotation.

24. The straddled vehicle starter motor according to claim 19, wherein
before the supply of the current to the rotor is started, the movable permanent magnet is located in the retarded angle position by a biasing force that the elastic member exerts in the retarded angle direction, and
the elastic member is configured to allow the movable permanent magnet to
move to the advanced angle position such that movement of the movable permanent magnet in the advanced angle direction by a reaction force of the rotor that acts on the movable permanent magnet is started within a third period from when the supply of the current to the rotor is started to when the rotor rotates, and
move the movable permanent magnet located in the advanced angle position in the retarded angle direction by the biasing force of the elastic member when a torque decreases along with the increase in a rotation speed of the rotor.

25. The straddled vehicle starter motor according to claim 24, further comprising a housing that houses at least the rotor, the brush, the movable permanent magnet, and the magnet moving unit, wherein
the rotor is rotatably supported by the housing,
the brush is provided to the housing such that the position of the brush with respect to the rotation direction of the rotor is fixed, and
the movable permanent magnet is supported by the housing so as to be movable in the circumferential direction of the rotor independently of the rotor.

26. An engine start-up device that starts up an engine mounted to a straddled vehicle, the engine start-up device comprising:
the straddled vehicle starter motor according to claim 24; and
a reduction drive connected to the rotor, and configured to transmit rotation of the rotor to the engine while decelerating the rotation.

27. The straddled vehicle starter motor according to claim 19, further comprising a housing that houses at least the rotor, the brush, the movable permanent magnet, and the magnet moving unit, wherein
the rotor is rotatably supported by the housing,
the brush is provided to the housing such that the position of the brush with respect to the rotation direction of the rotor is fixed, and
the movable permanent magnet is supported by the housing so as to be movable in the circumferential direction of the rotor independently of the rotor.

28. An engine start-up device that starts up an engine mounted to a straddled vehicle, the engine start-up device comprising:
the straddled vehicle starter motor according to claim 19; and a reduction drive connected to the rotor, and configured to transmit rotation of the rotor to the engine while decelerating the rotation.

29. The straddled vehicle starter motor according to claim 14, further comprising a housing that houses at least the rotor, the brush, the movable permanent magnet, and the magnet moving unit, wherein
the rotor is rotatably supported by the housing,
the brush is provided to the housing such that the position of the brush with respect to the rotation direction of the rotor is fixed, and
the movable permanent magnet is supported by the housing so as to be movable in the circumferential direction of the rotor independently of the rotor.

30. The straddled vehicle starter motor according to claim 29, comprising:
a plurality of movable permanent magnets arranged side by side in the circumferential direction of the rotor, each having a same configuration as that of the movable permanent magnet; and
a movable yoke part having the plurality of movable permanent magnets fixed thereto and arranged between the plurality of movable permanent magnets and the housing, wherein
the plurality of movable permanent magnets are supported by the housing via the movable yoke part.

31. The straddled vehicle starter motor according to claim 30, wherein
the housing includes a limiting unit that prevents the movable permanent magnet from moving beyond the angle range.

32. An engine start-up device that starts up an engine mounted to a straddled vehicle, the engine start-up device comprising:
the straddled vehicle starter motor according to claim 30; and
a reduction drive connected to the rotor, and configured to transmit rotation of the rotor to the engine while decelerating the rotation.

33. The straddled vehicle starter motor according to claim 29, wherein
the housing includes a limiting unit that prevents the movable permanent magnet from moving beyond the angle range.

34. An engine start-up device that starts up an engine mounted to a straddled vehicle, the engine start-up device comprising:
the straddled vehicle starter motor according to claim 33; and
a reduction drive connected to the rotor, and configured to transmit rotation of the rotor to the engine while decelerating the rotation.

35. An engine start-up device that starts up an engine mounted to a straddled vehicle, the engine start-up device comprising:
the straddled vehicle starter motor according to claim 29; and
a reduction drive connected to the rotor, and configured to transmit rotation of the rotor to the engine while decelerating the rotation.

36. An engine start-up device that starts up an engine mounted to a straddled vehicle, the engine start-up device comprising:
the straddled vehicle starter motor according to claim 14; and
a reduction drive connected to the rotor, and configured to transmit rotation of the rotor to the engine while decelerating the rotation.

37. An engine start-up device that starts up an engine mounted to a straddled vehicle, the engine start-up device comprising:
the straddled vehicle starter motor according to claim 1; and
a reduction drive connected to the rotor, and configured to transmit rotation of the rotor to the engine while decelerating the rotation.

38. A straddled vehicle comprising:
the engine start-up device according to claim 37; and
the engine that is started up by the engine start-up device.

* * * * *